United States Patent
Dutta et al.

(10) Patent No.: US 12,267,868 B2
(45) Date of Patent: Apr. 1, 2025

(54) SL RELIABILITY ENHANCEMENT BY HALF DUPLEX AND COLLISION DETECTION

(71) Applicant: QUALCOMM Incorporated, San Diego, CA (US)

(72) Inventors: Sourjya Dutta, San Diego, CA (US); Tien Viet Nguyen, Bridgewater, NJ (US); Kapil Gulati, Belle Mead, NJ (US); Gabi Sarkis, San Diego, CA (US)

(*) Notice: Subject to any disclaimer, the term of this patent is extended or adjusted under 35 U.S.C. 154(b) by 159 days.

(21) Appl. No.: 17/449,425

(22) Filed: Sep. 29, 2021

(65) Prior Publication Data

US 2022/0104263 A1 Mar. 31, 2022

Related U.S. Application Data

(60) Provisional application No. 63/086,006, filed on Sep. 30, 2020.

(51) Int. Cl.
*H04W 74/0808* (2024.01)
*H04L 5/00* (2006.01)
*H04W 24/08* (2009.01)
*H04W 74/00* (2009.01)

(52) U.S. Cl.
CPC ....... *H04W 74/0825* (2013.01); *H04L 5/0053* (2013.01); *H04L 5/006* (2013.01); *H04W 24/08* (2013.01); *H04W 74/002* (2013.01)

(58) Field of Classification Search
None
See application file for complete search history.

(56) References Cited

U.S. PATENT DOCUMENTS

| | | | |
|---|---|---|---|
| 2020/0145799 A1 | 5/2020 | Baghel et al. | |
| 2021/0160821 A1* | 5/2021 | Lin | H04W 72/02 |
| 2021/0160844 A1 | 5/2021 | Lin et al. | |
| 2022/0393834 A1* | 12/2022 | Thomas | H04W 72/20 |
| 2022/0408415 A1* | 12/2022 | Ji | H04L 1/1864 |

FOREIGN PATENT DOCUMENTS

WO WO-2020092939 A1 5/2020

OTHER PUBLICATIONS

Fujitsu Considerations on inter-UE coordination for mode 2 enhancements 3GPP TSG RAN WG1 #102-e R1-2005546 Aug. 7, 2020 (Year: 2020).*
International Search Report and Written Opinion—PCT/US2021/071661—ISA/EPO—Feb. 23, 2022.

* cited by examiner

*Primary Examiner* — Saad Khawar

(57) ABSTRACT

In one aspect, a method of wireless communication includes receiving, by a first user equipment (UE), a first transmission from a second UE for a new radio (NR) sidelink channel. The method also includes receiving, by the first UE, a second transmission from a third UE for the sidelink channel. The method further includes transmitting, by the first UE, a feedback transmission based on a medium contention event for the first and second transmissions of the NR sidelink channel and on a range condition. In additional aspects, the feedback transmission is transmitted based on a quality condition, or both a range condition and a quality condition. Other aspects and features are also claimed and described.

30 Claims, 9 Drawing Sheets

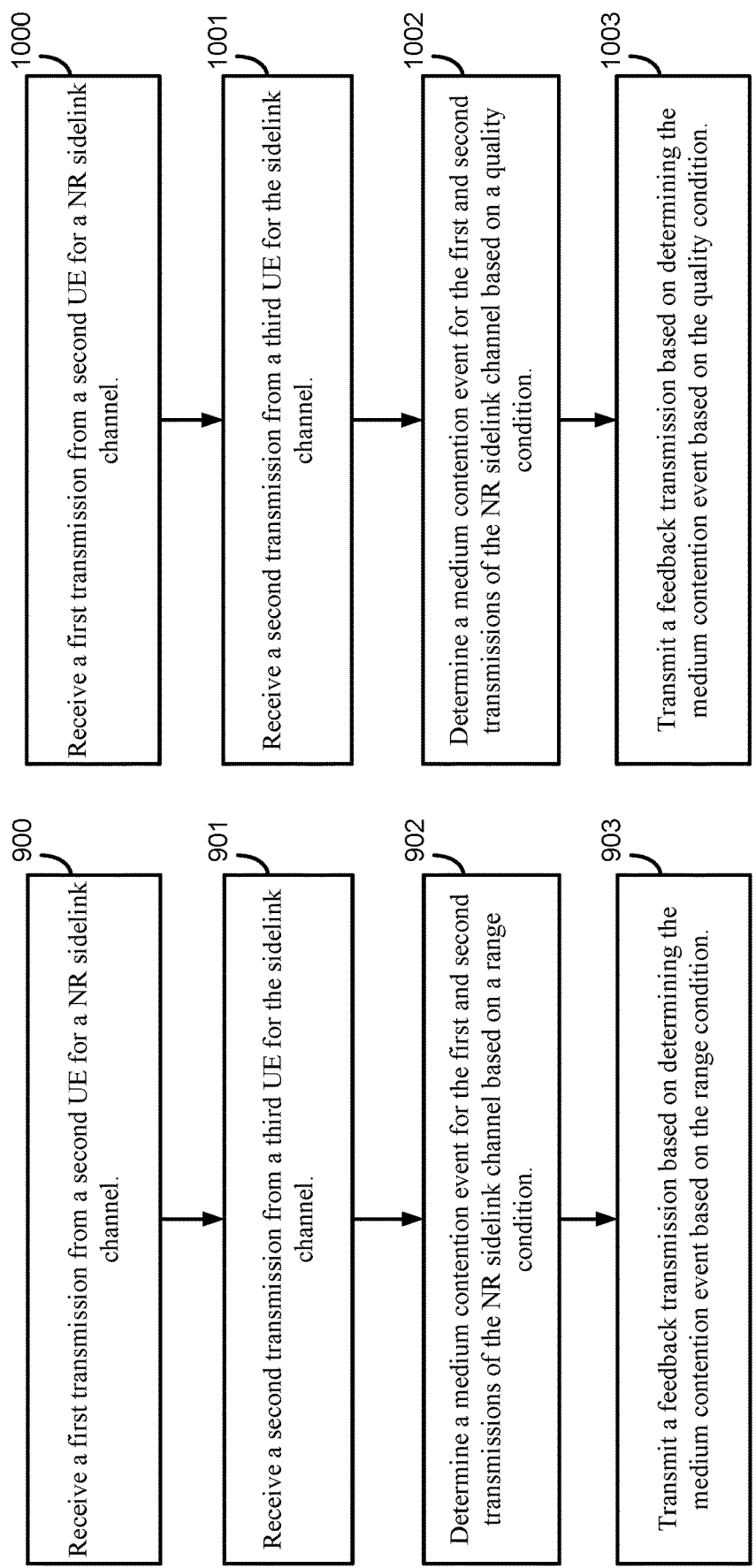

SL RELIABILITY ENHANCEMENT BY HALF DUPLEX AND COLLISION DETECTION

CROSS-REFERENCE TO RELATED APPLICATIONS

This application claims the benefit of U.S. Provisional Patent Application No. 63/086,006, entitled, "SL RELIABILITY ENHANCEMENT BY HALF DUPLEX AND COLLISION DETECTION," filed on Sep. 30, 2020, the disclosure of which is hereby incorporated by reference herein in its entirety as if fully set forth below and for all applicable purposes.

TECHNICAL FIELD

Aspects of the present disclosure relate generally to wireless communication systems, and more particularly, to medium contention event detection and mitigation. Certain embodiments of the technology discussed below may enable and provide medium contention event detection and mitigation for sidelink channels in 5G NR.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect, a method of wireless communication includes receiving, by a first user equipment (UE), a first transmission from a second UE for a new radio (NR) sidelink channel. The method also includes receiving, by the first UE, a second transmission from a third UE for the sidelink channel. The method further includes transmitting, by the first UE, a feedback transmission based on a medium contention event for the first and second transmissions of the NR sidelink channel and on a range condition.

In an additional aspect of the disclosure, an apparatus configured for wireless communication is disclosed. The apparatus includes at least one processor, and a memory coupled to the processor. The processor is configured to receive a first transmission from a second UE for a new radio (NR) sidelink channel; receive a second transmission from a third UE for the sidelink channel; and transmit a feedback transmission based on a medium contention event for the first and second transmissions of the NR sidelink channel and on a range condition.

In another aspect, a method of wireless communication includes receiving, by a first user equipment (UE), a first transmission from a second UE for a new radio (NR) sidelink channel. The method also includes receiving, by the first UE, a second transmission from a third UE for the sidelink channel. The method further includes transmitting, by the first UE, a feedback transmission based on a medium contention event for the first and second transmissions of the NR sidelink channel and on a quality condition.

In an additional aspect of the disclosure, an apparatus configured for wireless communication is disclosed. The apparatus includes at least one processor, and a memory coupled to the processor. The processor is configured to receive a first transmission from a second UE for a new radio (NR) sidelink channel; receive a second transmission from a third UE for the sidelink channel; and transmit a feedback transmission based on a medium contention event for the first and second transmissions of the NR sidelink channel and on a quality condition.

In one aspect of the disclosure, a method of wireless communication includes receiving, by a first user equipment (UE), a first transmission from a second UE for a new radio (NR) sidelink channel; receiving, by the first UE, a second transmission from a third UE for the sidelink channel; determining, by the first UE, a medium contention event for the first and second transmissions of the NR sidelink channel based on a range condition; and transmitting, by the first UE, a feedback transmission based on determining the medium contention event based on the range condition.

In an additional aspect of the disclosure, an apparatus configured for wireless communication is disclosed. The apparatus includes means for receiving, by a first user equipment (UE), a first transmission from a second UE for a new radio (NR) sidelink channel; means for receiving, by the first UE, a second transmission from a third UE for the sidelink channel; means for determining, by the first UE, a medium contention event for the first and second transmissions of the NR sidelink channel based on a range condition; and means for transmitting, by the first UE, a feedback transmission based on determining the medium contention event based on the range condition.

In an additional aspect of the disclosure, a non-transitory computer-readable medium having program code recorded thereon. The program code further includes code to receive, by a first user equipment (UE), a first transmission from a second UE for a new radio (NR) sidelink channel; receive, by the first UE, a second transmission from a third UE for the sidelink channel; determine, by the first UE, a medium contention event for the first and second transmissions of the NR sidelink channel based on a range condition; and transmit, by the first UE, a feedback transmission based on determining the medium contention event based on the range condition.

In an additional aspect of the disclosure, an apparatus configured for wireless communication is disclosed. The apparatus includes at least one processor, and a memory coupled to the processor. The processor is configured to receive, by a first user equipment (UE), a first transmission from a second UE for a new radio (NR) sidelink channel; receive, by the first UE, a second transmission from a third UE for the sidelink channel; determine, by the first UE, a medium contention event for the first and second transmissions of the NR sidelink channel based on a range condition; and transmit, by the first UE, a feedback transmission based on determining the medium contention event based on the range condition.

In another aspect of the disclosure, a method of wireless communication includes receiving, by a first user equipment (UE), a first transmission from a second UE for a new radio (NR) sidelink channel; receiving, by the first UE, a second transmission from a third UE for the sidelink channel; determining, by the first UE, a medium contention event for the first and second transmissions of the NR sidelink channel based on a quality condition; and transmitting, by the first UE, a feedback transmission based on determining the medium contention event based on the quality condition.

In an additional aspect of the disclosure, an apparatus configured for wireless communication is disclosed. The apparatus includes means for receiving, by a first user equipment (UE), a first transmission from a second UE for a new radio (NR) sidelink channel; means for receiving, by the first UE, a second transmission from a third UE for the sidelink channel; means for determining, by the first UE, a medium contention event for the first and second transmissions of the NR sidelink channel based on a quality condition; and means for transmitting, by the first UE, a feedback transmission based on determining the medium contention event based on the quality condition.

In an additional aspect of the disclosure, a non-transitory computer-readable medium having program code recorded thereon. The program code further includes code to receive, by a first user equipment (UE), a first transmission from a second UE for a new radio (NR) sidelink channel; receive, by the first UE, a second transmission from a third UE for the sidelink channel; determine, by the first UE, a medium contention event for the first and second transmissions of the NR sidelink channel based on a quality condition; and transmit, by the first UE, a feedback transmission based on determining the medium contention event based on the quality condition.

In an additional aspect of the disclosure, an apparatus configured for wireless communication is disclosed. The apparatus includes at least one processor, and a memory coupled to the processor. The processor is configured to receive, by a first user equipment (UE), a first transmission from a second UE for a new radio (NR) sidelink channel; receive, by the first UE, a second transmission from a third UE for the sidelink channel; determine, by the first UE, a medium contention event for the first and second transmissions of the NR sidelink channel based on a quality condition; and transmit, by the first UE, a feedback transmission based on determining the medium contention event based on the quality condition.

In yet another aspect of the disclosure, a method of wireless communication includes receiving, by a first user equipment (UE), a first transmission from a second UE for a new radio (NR) sidelink channel; receiving, by the first UE, a second transmission from a third UE for the NR sidelink channel; determining, by the first UE, a medium contention event for the first and second transmissions of the NR sidelink channel; determining, by the first UE, whether to transmit feedback for the medium contention event based on a range condition; and transmitting, by the first UE, a feedback transmission responsive to determining to transmit the feedback for the medium contention event based on the range condition.

In yet another aspect of the disclosure, a method of wireless communication includes receiving, by a first user equipment (UE), a first transmission from a second UE for a new radio (NR) sidelink channel; receiving, by the first UE, a second transmission from a third UE for the NR sidelink channel; determining, by the first UE, whether to perform medium contention event detection for the second UE, the third UE, or both, based on a range condition; determining, by the first UE, a medium contention event for the first and second transmissions based on determining to perform medium contention event detection; and transmitting, by the first UE, a feedback transmission responsive to determining to the medium contention event.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 9 is a flow diagram illustrating example blocks executed by a UE configured according to an aspect of the present disclosure.

FIG. 10 is a flow diagram illustrating example blocks executed by a UE configured according to another aspect of the present disclosure.

DETAILED DESCRIPTION

Figure 1:
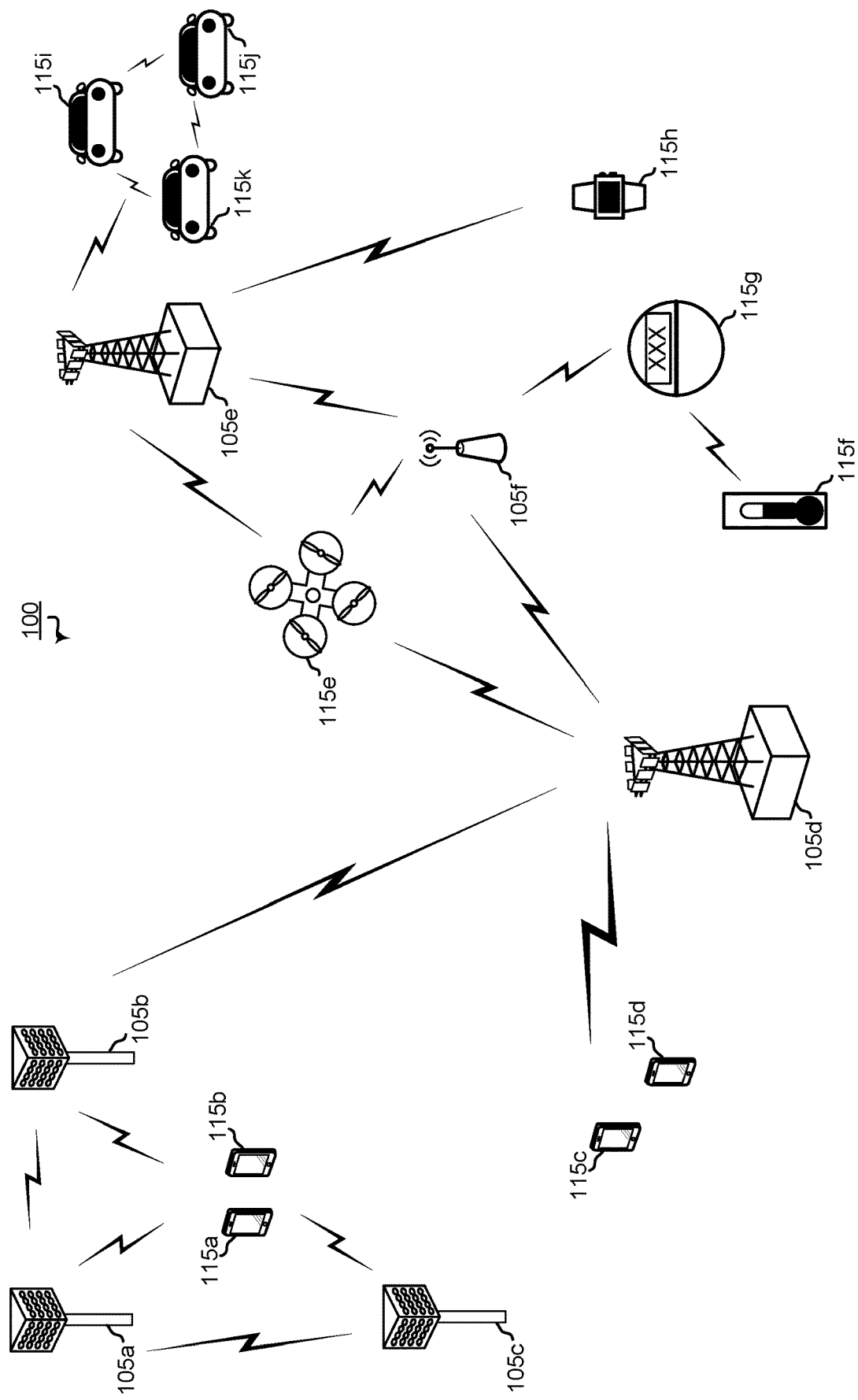
FIG. 1 is a block diagram illustrating details of a wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
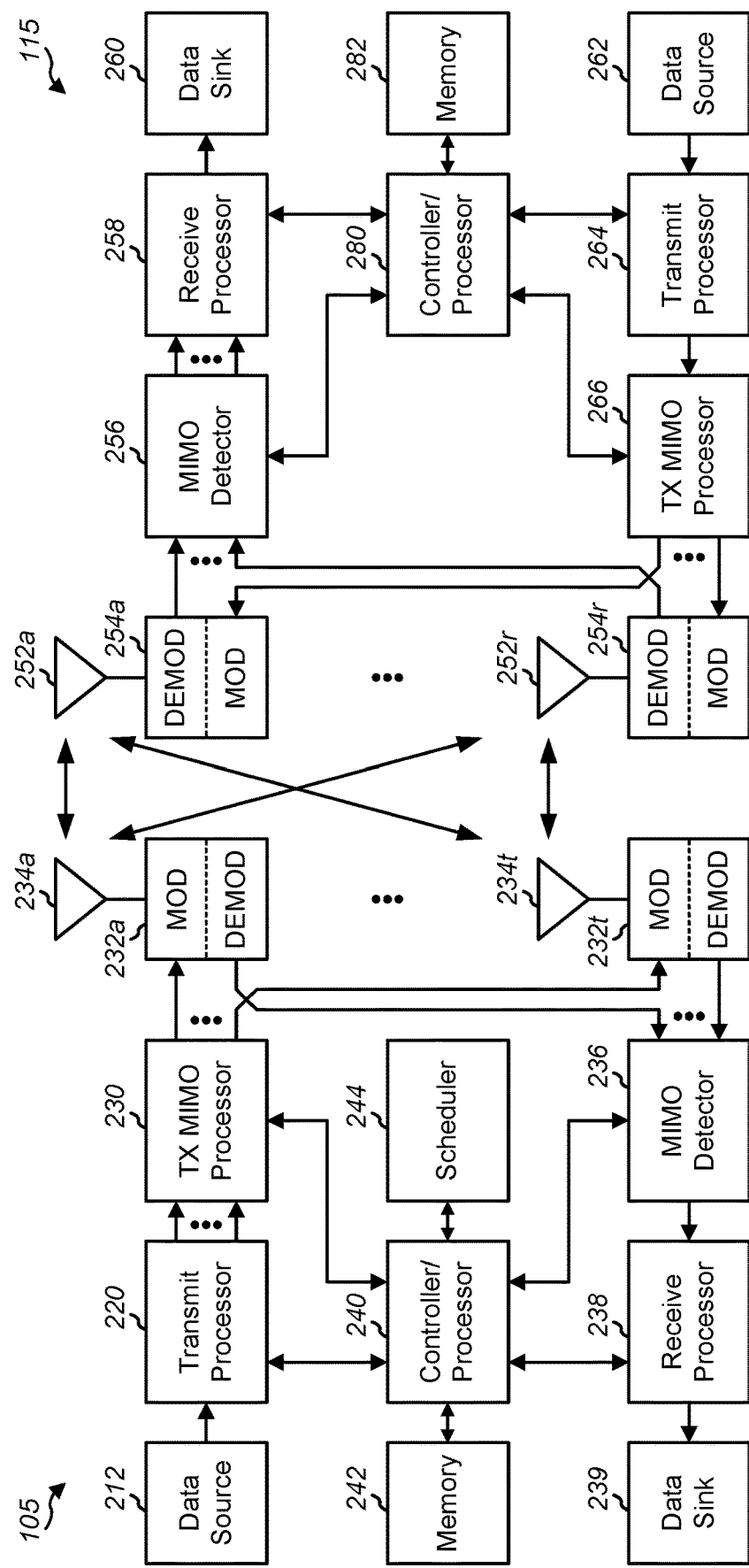
FIG. 2 is a block diagram conceptually illustrating a design of a base station and a UE configured according to some aspects.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 7 and 8, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/ negative-acknowledge (ACK/NACK) feedback for its own transmitted packets as a proxy for collisions.

Figure 3A:
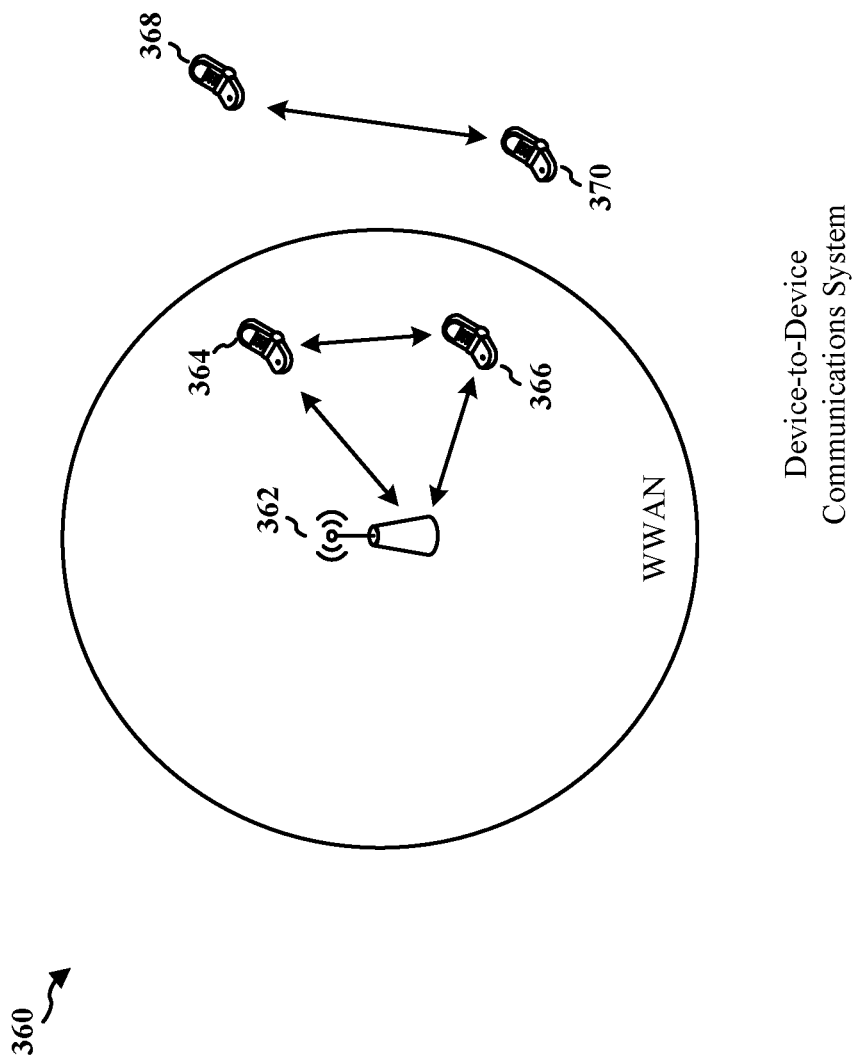
FIG. 3A is a diagram of a device-to-device communications system.

FIG. 3A is a diagram of a device-to-device (D2D) communications system 360. The D2D communications system 360 includes a plurality of UEs 364, 366, 368, 370. The D2D communications system 360 may overlap with a cellular communications system, such as for example, a WWAN. Some of the UEs 364, 366, 368, 370 may communicate together in D2D communication using the DL/UL WWAN spectrum, some may communicate with the base station 362, and some may do both. For example, as shown in FIG. 3A, the UEs 368, 370 are in D2D communication and the UEs 364, 366 are in D2D communication. The UEs 364, 366 are also communicating with the base station 362. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on NR, LTE, FlashLinQ, WiMedia, Bluetooth, ZigBee, or Wi-Fi based on the IEEE 802.11 standard. To simplify the discussion, the exemplary methods and apparatus are discussed within the context of NR. However, one of ordinary skill in the art would understand that the exemplary methods and apparatuses are applicable more generally to a variety of other wireless device-to-device communication systems.

D2D communication may be used to provide direct communication between devices. D2D communication enables one device to communicate with another device and transmit data to the other device over allocated resources. One use for the D2D communication is a vehicle-to-vehicle (V2V) communication and vehicle-to-everything (V2X) communication. Thus, according to the V2V communication, a first vehicle's device may perform D2D communication with another vehicle's device. According to the V2X communication, a vehicle's device may perform D2D communication with another device, regardless of whether that the device resides in a vehicle or not.

One type of communication that may be used for V2V communication is dedicated short range communication (DSRC). The DSRC is a short-range wireless communication capability, typically based on IEEE 802.11p that is similar to Wi-FI. In the DSRC, before transmission, a device may examine a channel. For transportation-related communications (e.g., V2X communication), 5.9 GHz unlicensed spectrum is generally reserved to communicate intelligent transportation services (ITS). Recently, implementing other types of communication such as NR communication for V2V communication have been under development. For example, NR D2D may be utilized for V2V communication, over a licensed spectrum and/or an unlicensed spectrum.

In a vehicle-to-everything (V2X) wireless communication system, UEs may communicate directly using device-to-device communication, also known as sidelink communication, without using a network entity (e.g., base station) as an intermediary. In some cases, a UE may operate using a particular transmission mode, such as transmission mode 4, where resource selection and/or scheduling is performed by the UE rather than a network entity (e.g., base station). In some aspects, the UE may perform resource selection and/or scheduling by measuring one or more sidelink channels, by decoding sidelink control information (SCI) that indicates channel availability, by determining a channel busy rate (CBR) associated with various sidelink channels, and/or the like.

In transmission mode 4, a UE may generate sidelink grants, and may transmit the sidelink grants in SCI. A sidelink grant may indicate, for example, one or more parameters (e.g., transmission parameters) to be used for an upcoming V2X transmission (e.g., a V2X data transmission), such as one or more resource blocks to be used for the upcoming V2X transmission, one or more subframes to be used for the upcoming V2X transmission, a modulation and coding scheme (MCS) to be used for the upcoming V2X transmission, and/or the like.

In V2X communication systems, conditions of the sidelink channel used to carry V2X communications can vary widely and change quickly due to the high mobility of vehicles and UEs associated with the vehicles, large variations in vehicle traffic at different times of day and in different locations, a wide variety of topographies that the vehicles may traverse (e.g., dense urban environments, hilly environments, flat environments, etc.), and/or the like. Furthermore, V2X communication systems need to be highly reliable due to mission critical safety issues associated with, for example, autonomous vehicles. Some techniques and apparatuses described herein improve performance of V2X communication systems by dynamically determining parameters for V2X transmissions based at least in part on dynamic factors associated with one or more vehicles, the sidelink channel, and/or the like.

In some aspects, V2X transmissions may be one-to-many broadcast and/or multicast transmissions. In some aspects, V2X transmissions may not require any physical layer feedback from receiving devices, such as acknowledgement (ACK) or negative acknowledgement (NACK) feedback. In some aspects, V2X transmissions may be configured without retransmission. In some aspects, V2X transmissions may be configured with a number of retransmissions (e.g., five retransmissions). In a particular aspect, the retransmission occur automatically, such as without ACK/NACK feedback.

A first UE may communicate with a second UE (and one or more other UEs) using device-to-device (D2D) communications via one or more sidelink channels. In some aspects, the UEs may correspond to one or more other UEs described elsewhere herein. The UEs may transmit V2X communications using the sidelink channel.

The sidelink channel may include a physical sidelink control channel (PSCCH) and a physical sidelink shared channel (PSSCH). The sidelink channel may optionally include a physical sidelink feedback channel (PSFCH). The PSCCH may be used to communicate control information, similar to a physical downlink control channel (PDCCH) and/or a physical uplink control channel (PUCCH) used for communications with a base station. The PSSCH may be used to communicate data, similar to a physical downlink shared channel (PDSCH) and/or a physical uplink shared channel (PUSCH) used for communications with a base station. For example, the PSCCH may carry sidelink control information (SCI), which may indicate various control information used for sidelink communications, such as one or more resources (e.g., time and/or frequency resources) where a transport block (TB) that includes data is carried on the PSSCH. The TB may include V2X data, such as a basic safety message (BSM), a traffic information message (TIM), a signal phase and time (SPAT) message, a MAP message to convey geographic road information, a cooperative awareness message (CAM), a distributed environment notification message (DENM), an in-vehicle information (IVI) message, and/or the like.

In some aspects, the sidelink channel may use resource pools. For example, a scheduling assignment (e.g., included in SCI) may be transmitted in sub-channels using specific resource blocks (RBs) across time. In some aspects, data transmissions (e.g., on the PSSCH) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE may operate using transmission mode 4, where resource selection and/or scheduling is performed by the UE (e.g., rather than a base station). In some aspects, the UE may perform resource selection and/or scheduling by sensing channel availability for transmissions. For example, the UE may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of V2X communications based at least in part on the measurement(s).

Additionally, or alternatively, the UE may perform resource selection and/or scheduling using SCI received in the PSCCH, which may indicate occupied resources, channel parameters, and/or the like. Additionally, or alternatively, the UE may perform resource selection and/or scheduling by determining a channel busy rate (CBR) associated with various sidelink channels, which may be used for rate control (e.g., by indicating a maximum number of resource blocks that the UE can use for a particular set of subframes).

In transmission mode 4, a UE may generate sidelink grants, and may transmit the grants in SCI. A sidelink grant may indicate, for example, one or more parameters (e.g., transmission parameters) to be used for an upcoming V2X transmission, such as one or more resource blocks to be used for the upcoming V2X transmission on the PSSCH (e.g., for TBs), one or more subframes to be used for the upcoming V2X transmission, a modulation and coding scheme (MCS) to be used for the upcoming V2X transmission, and/or the like. In some aspects, a UE may generate a sidelink grant that indicates one or more parameters for semi-persistent scheduling (SPS), such as a periodicity of a V2X transmission (e.g., a periodic V2X message, such as a safety message and/or the like). Additionally, or alternatively, the UE may generate a sidelink grant for event-driven scheduling, such as for an on-demand V2X message.

In V2X communication systems, conditions of the sidelink channel used to carry V2X communications can vary widely and change quickly due to the high mobility of vehicles and UEs associated with the vehicles, large variations in vehicle traffic at different times of day and in different locations, a wide variety of topographies that the vehicles may traverse (e.g., dense urban environments, hilly environments, flat environments, etc.), and/or the like. Furthermore, V2X communication systems need to be highly reliable due to mission critical safety issues associated with, for example, autonomous vehicles. Some techniques and apparatuses described herein improve performance of V2X communication systems by dynamically determining parameters for V2X transmissions based at least in part on dynamic factors associated with one or more vehicles, the sidelink channel, and/or the like.

In some implementations, a UE may be able to perform autonomous resource selection for V2X transmissions, in accordance with various aspects of the present disclosure.

For example, a UE may determine a limit on a number of resource blocks (RBs) permitted to be used for a V2X transmission by the UE. In some aspects, the UE may determine the limit based at least in part on a congestion level of one or more sidelink channels, which may be determined based at least in part on measuring one or more sidelink channels (e.g., for S-RSSI, PSSCH-RSRP, and/or the like), receiving SCI associated with the one or more sidelink channels, and/or the like. For example, the UE may determine a channel busy rate (CBR) for a sidelink channel in association with a time n at which resource selection is triggered for the UE (e.g., CBR(n−100, n−1), where n−100 denotes a start of a time period and n−1 denotes the end of the time period), and may determine a maximum number of RBs allowed for use by the UE at time n based at least in part on the CBR. Additionally, or alternatively, the UE may determine the limit on the number of RBs by determining a maximum number of RBs allowed for use by the UE in association with time n (e.g., CRlimit(n)) and subtracting a number of RBs already used or scheduled by the UE in association with time n (e.g., CR(n−a, n+b), where n−a denotes a start of the time period and n+b denotes an end of the time period).

The UE may determine one or more parameters for the V2X transmission based at least in part on the limit on the number of RBs. In some aspects, the one or more parameters may be referred to as one or more transmission parameters and/or one or more V2X transmission parameters. As shown, the one or more parameters may include a modulation and coding scheme (MCS) for the V2X transmission, a number of transport blocks (TBs) for the V2X transmission, a number of RBs per TB for the V2X transmission, a retransmission configuration for the V2X transmission, and/or the like. In some aspects, the UE may determine the one or more parameters such that the number of RBs for the V2X transmission does not exceed the limit on the number of RBs.

As an example, if the UE selects an MCS with a lower index value (e.g., permitting fewer bits per symbol) for a V2X transmission, then that V2X transmission would require more TBs and corresponding RBs than if the same V2X transmission were to use an MCS with a higher index value (e.g., permitting more bits per symbol). However, using an MCS with a lower index value for the V2X transmission may increase the range of the V2X transmission and/or may increase reliability of the V2X transmission as compared to using an MCS with a higher index value. Thus, in some aspects, if the limit on the number of RBs is relatively high (e.g., greater than or equal to a threshold), then the UE may select an MCS with a lower index value, and if the limit on the number of RBs is relatively low (e.g., less than or equal to a threshold), then the UE may select an MCS with a higher index value. In some aspects, the UE may select from multiple different MCS index values, and different MCS index values may be associated with different thresholds for the limit on the number of RBs.

As another example, if the UE configures a retransmission configuration to enable retransmissions for a V2X transmission, then that V2X transmission would require more TBs and corresponding RBs than if the UE were to configure the retransmission configuration to disable retransmissions for the same V2X transmission. However, enabling retransmissions for the V2X transmission may increase the range of the V2X transmission and/or may increase reliability of the V2X transmission as compared to disabling retransmissions for the V2X transmission. Thus, in some aspects, if the limit on the number of RBs is relatively high (e.g., greater than or equal to a threshold), then the UE may enable retransmissions, and if the limit on the number of RBs is relatively low (e.g., less than or equal to a threshold), then the UE may disable retransmissions. In some aspects, the UE may select from multiple different quantities of retransmissions (e.g., one retransmission, two retransmissions, etc.), and different quantities of retransmissions may be associated with different thresholds for the limit on the number of RBs.

In some aspects, the UE may select the one or more parameters to increase or maximize a range for the V2X transmission (e.g., a distance that can be covered by the V2X transmission and corresponding retransmissions) subject to the limit on the number of RBs, as described in more detail below in connection with FIG. 5. In this way, the UE may improve reliability, may increase safety, may increase the likelihood of successful reception of the V2X transmission, etc., while operating according to the limit on the number of RBs permitted for the V2X transmission.

In a V2X communication system, sidelink channel conditions can vary widely at different times, at different geographic locations, on different frequencies, and/or the like. Thus, the UE may dynamically determine the one or more parameters for the V2X transmission based at least in part on conditions that exist at the time that the V2X transmission is scheduled. In some aspects, the UE may determine the one or more transmission parameters based at least in part on a dynamic factor associated with the UE and/or a vehicle associated with the UE (e.g., a network traffic demand associated with one or more applications of the UE, congestion, and/or the like). Additionally, or alternatively, the UE may determine the one or more transmission parameters based at least in part on a dynamic factor associated with a wireless network via which the V2X transmission is to be transmitted (e.g., a congestion level associated with the wireless network, a carrier frequency on which the V2X transmission is to be transmitted, a priority of the V2X transmission on the wireless network, and/or the like). In this way, the UE may improve or optimize transmission of V2X messages under changing conditions.

Additionally, or alternatively, the UE may determine the one or more V2X transmission parameters based at least in part on the selected frequency or frequencies. For example, different frequencies may be associated with different CBR values, and thus may be associated with different limits on the number of RBs permitted for use by the UE. Additionally, or alternatively, different combinations of transmission parameters may result in different performance at different frequencies, and the UE may use this as a factor when determining the one or more transmission parameters.

In some aspects, the UE may determine the one or more transmission parameters based at least in part on a network traffic demand associated with one or more applications of the UE. For example, if the first UE has a relatively high network traffic demand (e.g., the number of requested V2X transmissions is greater than or equal to a threshold), then the UE may use a smaller number of RBs per V2X transmission. Conversely, if the UE has a relatively low network traffic demand (e.g., the number of requested V2X transmissions is less than or equal to a threshold), then the UE may use a larger number of RBs per V2X transmission. The UE may configure a smaller number of RBs per V2X transmission by using a higher MCS index, by disabling retransmissions or configuring a smaller number of retransmissions, by using a smaller number of TBs, and/or by using a smaller number of RBs per TB. Conversely, the UE may configure a larger number of RBs per V2X transmission by using a lower MCS index, by enabling retransmissions or configuring a larger number of retransmissions, by using a larger number of TBs, and/or by using a larger number of RBs per TB.

Additionally, or alternatively, the UE may determine the one or more transmission parameters based at least in part on a congestion level associated with a wireless network via which the V2X transmission is to be transmitted (e.g., a congestion level of the sidelink channel and/or one or more frequencies via which the V2X transmission is to be transmitted). For example, if the wireless network has a relatively high congestion level, then the UE may use a smaller number of RBs per V2X transmission. Conversely, if the wireless network has a relatively low congestion level, then the UE may use a larger number of RBs per V2X transmission. In some aspects, the UE may determine the congestion level based at least in part on a CBR, a resource restriction (e.g., a rate control parameter, a power control parameter, a congestion control parameter, etc.), a measured parameter of the wireless network (e.g., an energy level), and/or the like.

The UE may transmit the V2X transmission (e.g., to a second UE and/or one or more other UEs) based at least in part on the one or more parameters. For example, the UE may modulate and/or encode the V2X transmission using a selected MCS, may transmit the V2X transmission using a selected number of TBs, may transmit the V2X transmission using a selected number of RBs per TB, may retransmit or prevent retransmission of the V2X transmission according to a selected retransmission configuration, may transmit the V2X transmission on a selected carrier frequency, and/or the like. By accounting for dynamic factors when determining the above transmission parameter(s), the UE may improve performance (e.g., a transmission range) of the V2X transmission subject to constraints on the V2X transmission. For example, in some cases, the UE may transmit a V2X transmission using an MCS with a high index, rather than dropping the V2X transmission.

Figure 3B:
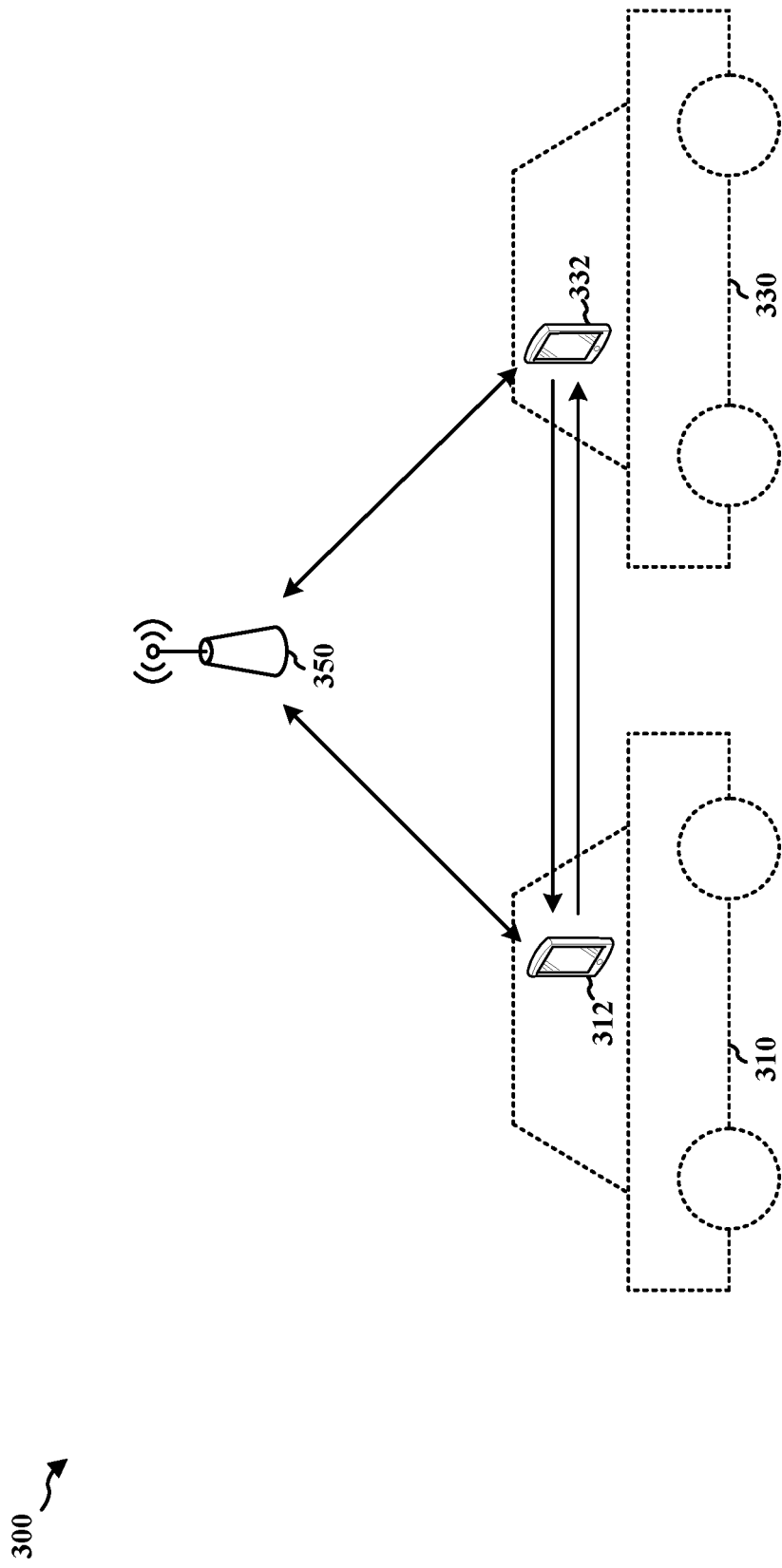
FIG. 3B is an example diagram illustrating device-to-device communication.

FIG. 3B is an example diagram 300 illustrating device-to-device communication. A first device 312 (e.g., UE 312) is present in a first vehicle 310, and thus may travel with the first vehicle 310. A second device 332 (e.g., another UE 332) may be present in a second vehicle 330. In another aspect, the first device 312 may be present independently from the first vehicle 310 or may be a part of the first vehicle 310. The second device 332 may be present independently from the second vehicle 330, or may be a part of the second vehicle 330. The first device 312 and the second device 332 may be connected (e.g., in connected mode with the base station) to a base station 405. The first device 312 and the second device 332 may also be configured to perform D2D communication with each other over NR. The first device 312 and the second device 332 may also perform short range communication with each other over IEEE 802.11p.

The vehicles may include an autonomous vehicle, a semi-autonomous vehicle, a non-autonomous vehicle, and/or the like. Although both UEs in FIG. 3B are shown as being associated with a vehicle, in some aspects, one or more of the UEs may not be associated with a vehicle. For example, a UE may be associated with infrastructure (e.g., traffic infrastructure), such as a traffic signal, a lane signal, a sensor, a traffic controller system, and/or the like.

NR V2V communication may provide more reliable performance than LTE V2V by providing for a more history based calculation of congestion and/or a more limited reliance on future periodic transmissions. Although the following discussion refers to NR V2V communication by way of illustration and not limitation, the NR V2V communication is similar to NR D2D communication, and thus following discussion may also apply to NR and LTE D2D communication.

Congestion may occur in NR V2V communication, e.g., due to increased network traffic. Congestion control may be implemented to control network congestion via certain parameters related to communication over NR V2V based on a level of the congestion. For example, in certain instances, there may be no centralized entity to perform congestion control of the spectrum. The congestion control may be performed without a centralized entity (e.g. eNB) to manage admission control and/or radio resource utilization (e.g. out-of-network coverage operation, and/or with decentralized resource selection/reselection procedures). Without a centralized entity managing network resources and device communications, collisions of different communications may occur. Too many collisions may adversely affect the performance of the communication system. For example, collisions may occur when resources are not properly allocated to different device communications which may result in some devices not having sufficient resources for communication. Depending on the communication system and/or the channel access method of the communication system, a device may not be able to handle network congestion. For example, a number of communications that can be successfully performed reliably in a network may vary depending on a type of a communication system. Decentralized congestion control may be based on an 802.11p physical layer and may be generalized to provide coexistence of various technologies. Therefore, technology-neutral decentralized congestion control in a system with no centralized entity for managing congestion may be desirable. In some aspects, technology specific enhancements for decentralized congestion control may be provided.

In an aspect, congestion control may be based on a channel busy ratio (CBR) and/or a channel utilization. The CBR may represent a percentage of busy resources. The channel utilization may represent a percentage of a channel being utilized for communication. The CBR and the channel utilization may be technology-neutral, as described below. Decentralized congestion control for the 802.11p technology may be derived based on the technology-neutral congestion control while the technology-neutral approach for decentralized congestion control may be used for NR V2V.

Each UE may estimate a channel utilization based on a CBR. The CBR may be an estimate of the percentage of the resources that are deemed busy/utilized. In an aspect, a resource may be deemed busy and/or utilized if a signal is decoded on such a resource or if the energy in such a resource is greater than an energy threshold.

The CBR may be estimated by dividing a number of probes that found busy resources by a number of total probes on the resources, according to the following equation:

$$CBR_{est} = \frac{\sum 1 \vee \text{probe with resource busy}}{Np}$$

where:
1∨ probe with resource busy is the indicator function for a probe that found the resource busy.
Np is the total number of probes that probed resources for resource-busy measurements.
Nt is the time granularity of resource utilization (e.g. a 1 ms TTI for NR, an OFDM symbol duration for 802.11p)
Nf is the frequency granularity of resource utilization (e.g. channel BW for 802.11p, 180 kHz for NR). Nt and Nf may define granularity of resources when the resources are allocated by time and frequency.

For example, if the UE probes every 10 microseconds, probing for 100 msec would yield a total number of probes equal to 10000. If there are a total of 10000 probes used to probe for busy resources, and 8000 probes found that the resources probed are busy, then the CBR of the system may be 80%.

CBR may be a function of the number of stations $N_{Sta}$ (e.g., a number of UEs, a number of transmitters) within certain proximity:

$$CBR = f(N_{sta}),$$

where the function $f(N_{sta})$ may be technology dependent and may depend on a channel access procedure of a corresponding technology.

In an aspect, congestion control may be performed by limiting the channel utilization per UE if the estimated CBR exceeds a CBR limit ($CBR_{limit}$). The channel utilization per UE may be expressed as a channel resource (CR). A CR limit (e.g., per UE or STA) may be determined by dividing a total resources that the system can utilize (e.g., $CBR_{limit}$) by a number of stations (e.g., UEs) $N_{sta}$, which can be expressed as:

$$CR_{limit} = \frac{CBR_{limit}}{N_{Sta}} = \frac{CBR_{limit}}{f^{-1}(CBR)}$$

In an alternate formulation, since the congestion control may be activated when the estimated CBR exceeds a CBR limit ($CBR_{limit}$), the CR limit (e.g., per UE or STA) may be determined as:

$$CR_{limit} = \frac{CBR}{N_{Sta}} = \frac{CBR}{f^{-1}(CBR)}$$

In one approach, CBR may be estimated using a linear function of $N_{Sta}$, which may be expressed as $CBR = a*N_{sta} + b$. For technology coexistence with 802.11p, the parameters may be $1/a = 4000$ and $b = 0.62$ (target CBR limit). Additionally, the CR for 802.11p may be estimated as $T_{on}/(T_{on} + T_{off})$ due to TDMA access (when a device transmits on the entire channel bandwidth and there is no FDMA operation), where $T_{on}$ is a duration of time when the UE is on and $T_{off}$ is a duration of time when the UE is off. $CR_{limit}$ may be estimated as $T_{on}/(T_{on} + T_{off\_limit})$, where $T_{off\_limit}$ the minimum time that the UE may be off to maintain the channel utilization to be less than the CR limit.

Using the above approach for 802.11p, the following equations may be achieved.

$$\frac{1}{CR_{limit}} = 1 + \frac{T_{off\_limit}}{T_{on}} = \frac{\frac{CBR - b}{a}}{CBR} \Rightarrow T_{off\_limit} = T_{on} \times \left(\frac{1}{a}\frac{CBR - b}{CBR} - 1\right)$$

Thus, a CR for 802.11p may be $T_{on}$ divided by the total time: $CR=T_{on}/(T_{on}+T_{off})$. For example, if the UE is on 400 msec and off for 100 msec, then the CR is $400/(400+100)=4/5$. In an aspect, if the UE is on longer, the UE should be off longer. Further, as shown above, $T_{off}$ or $T_{off\_limit}$ may be a linear function of $T_{on}$, which depends on the CBR. Thus, if the channel is busy and thus the CBR is high, the UE may backoff more on transmissions due to a greater $T_{off}$ or a greater $T_{off\_limit}$.

The above congestion control approach may have the following limitations when used in a system with multiple technologies sharing the network resources. Firstly, the CBR and channel utilization (e.g., a CR) definitions may be applicable only to TDMA systems, where $CR=T_{on}/(T_{on}+T_{off})$. Secondly, a UE estimating the CBR of the system may treat all radio resources equally, which may cause a problem for NR V2V. In particular, for NR V2V, the total radio resources may be split into control resources and data resources. When separate resources are used for control and data, control resources may become congested while the overall resources are not congested (e.g., due to the data resources being free and not congested). In such an example, treating all resources equally when there are different types of resources may not effectively address the congestion of resources in the system. Thus, an approach to consider a CBR for control resources and a CBR for data resources separately is desired. For example, by considering a CBR for control resources and a CBR for data resources separately, if the control resources are too congested, the system may fail even if the data resources are available. Similarly, a CBR for control resources and a CBR for data resources separately, if the data resources are too congested, the system may fail even if the control resources are available.

Thirdly, as discussed above, the UE may determine that a resource is busy if a signal is decoded on the resource and/or the energy measured on the resource is greater than a threshold. However, such a determination of a busy resource by the UE may not consider coexistence of multiple technologies on the same channel. Thus, an approach to congestion control for coexistence of multiple technologies in addressing the network congestion is desired. For example, according to an aspect of the disclosure, to enable coexistence, each of the technologies may not be allowed to utilize more than 40% of the total resources if a total channel utilization is 80%.

Fourthly, use of a single threshold for the CBR independent of a priority of transmissions may not allow the UE to place more importance in transmission of higher priority packets than in transmission of lower priority packets. Thus, it may be beneficial for the system to have different congestion limits for packets with different priorities. In an aspect, it may be desirable to control packet transmission based on the priorities of the packets. For example, according to an aspect of the disclosure, if channel utilization is over a certain threshold (e.g., 50%), the UE may not transmit low priority packets, but may transmit high priority packets, which may provide more resources for transmitting higher priority packets.

The aspects described herein are directed to enhanced medium contention operations for sidelink communications. Such sidelink channel communications may utilize distributed resource selection. For example, sidelink UEs operating in V2X, D2D etc., reserve resources in a distributed manner. To illustrate, a UE will send sidelink Control Information (SCI) which indicates reservation and decode information for a current transmission and optionally one or more future reservations for possible re-transmissions for the current transmission. UEs in the network will monitor/sense the channel and try to decode the SCI. The receiving UEs decode the SCI and determine the future reservations for possible re-transmissions for the received transmission. In some such implementations, the UEs will measure a RSRP of the SCI and may try to avoid the future resources reserved by the UE based on the measured RSRP of the SCI.

In distributed resource selection operation, reliability can deteriorate due to a multiple of factors. For example, a SCI decode failure reduces reliability. In many such scenarios, the UEs may not be able to receive or decode the SCI from other UEs. This is often caused by medium contention events, such as half-duplex operations or collisions. A half-duplex operation is when two or more UEs transmit at the same time. A collision is when two UEs transmits at the same time and the resources used to transmit at least partially overlap. Such medium contention events may be caused by "hidden nodes" or timeline issues. As an example, two UEs may be relatively close enough to one another, but may not be aware of each other due to channel conditions, such as blockage, no line of sight, etc. As another example, two UEs may chose the same time and/or frequency resource because of delay budget constraints. To illustrate, HARQ timelines (aka feedback timing gaps) may cause multiple UEs to attempt to transmit HARQ feedback for the transmission in the same resources.

Such medium contention events and the possible corresponding negative effects may be reduced by inter-UE coordination. In the example where two UEs transmit at the same time (and/or on overlapping resources), the two UEs may not be able to hear one another. However, a third UE may be able to decode the transmissions or a portion thereof (e.g., a control channel portion) from both the UEs and identify a possible medium contention event (e.g., half-duplex/collision). The UE may use the feedback channel to notify the two UEs of this medium contention event. The notification happens after the medium contention event has occurred and may trigger the two UEs to re-transmit the packet.

In actual networks, it may not be beneficial to indicate all such medium contention event (e.g., collisions/half duplex events). In some cases, the two UEs may not be interested to talk to each other. For example, they may be in different groups. Or the UEs may not be able to communicate with each other. For example, the UEs may be far apart, not have line of sight, etc. In some such cases, making the UEs retransmit the transmission (e.g., packet) may unnecessarily increase network load. Thus, network performance can be improved when limiting when feedback is sent to situations and circumstances when the feedback is helpful or beneficial.

The aspects described herein enable enhanced medium contention operations for sidelink communications. Specifically, the aspects enable UEs to determine when to send feedback and to filter out feedback which is not likely to be beneficial or which is lower priority, and thus can limit or reduce medium contention feedback. In a particular aspect, a receiving UE detects a medium contention event when two transmit UEs transmits at the same time. The receiving UE may consider the UEs for half-duplex detection if the UEs satisfy a range condition. In one example, the transmit UEs are within a given distance from the receiving UE. The distance information for the transmit UEs may be determined from decoded sidelink channel communications (e.g., SCIs). Additionally, or alternatively, the receiving UE may consider the UEs for half-duplex detection if the UEs satisfy a quality condition. In one example, the RSRP received by the receiving UE for the transmits UEs is above a threshold RSRP.

The receiving UE may additionally send feedback to the transmit UEs based on one or more other conditions. For example, the receiving UE may only send the feedback if the two UEs are no more than another distance threshold apart. This threshold may be fixed, semi-statically set, or determined based on one or more parameters, such as channel congestion. Additionally, or alternatively, the receiving UE may provide feedback if the RSRP from the transmits UEs are within a threshold dB value from each other.

The operations and techniques proposed herein enable enhanced medium contention operations to improve system performance. Specifically, the medium contention operations described herein improve detection and reporting (feedback) of medium contention events (e.g., half-duplex operations, collision events, etc.) For example, one or more conditions (e.g., range conditions, quality conditions, etc.) may be used to filter medium contention event detection and/or reporting. Thus, a network may selectively detect and/or report medium contention events for a sidelink channel. Such selective detection and/or reporting filters low priority medium contention event feedback and reduces network congestion and overhead, while still ensuring medium contention event feedback for medium contention events which may be harmful to the network are reported. Thus, the benefits of medium contention event feedback are retained, with less network overhead.

Figure 4:
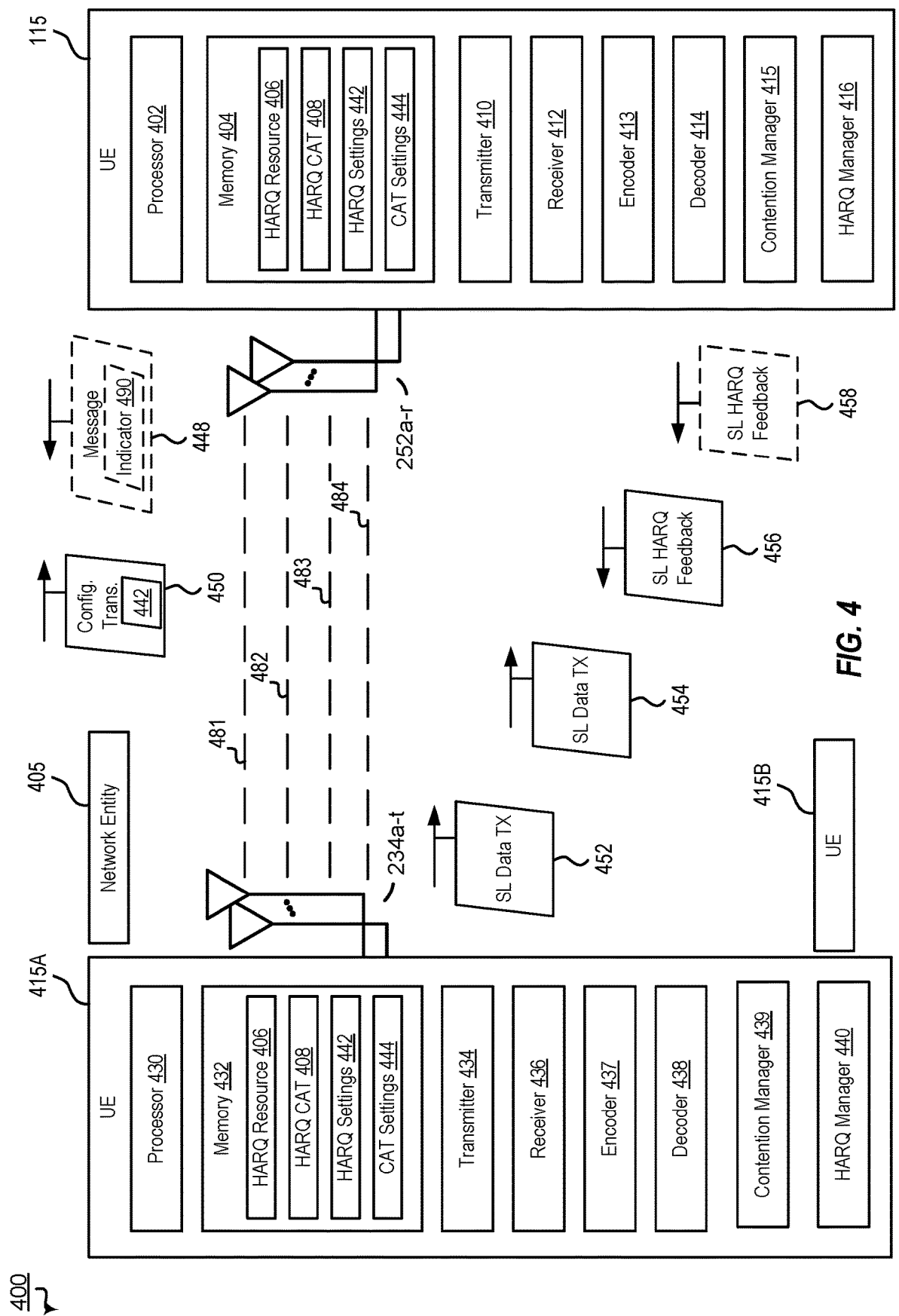
FIG. 4 is a block diagram illustrating an example of a wireless communications system (with a UE and base station) with medium contention operations for sidelink channel communications.

FIG. 4 illustrates an example of a wireless communications system 400 that supports enhanced medium contention operations for sidelink communications in accordance with aspects of the present disclosure. In some examples, wireless communications system 400 may implement aspects of wireless communication system 100. For example, wireless communications system 400 may include UEs 115, 415A, and 415B. Enhanced medium contention for sidelink communications operations may reduce network overhead and latency and increase throughput. Thus, network and device performance can be increased.

UEs 115, 415A, and 415B may be configured to communicate via one or more portions of the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "mmWave" band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

It is noted that SCS may be equal to 15, 30, 60, or 120 kHz for some data channels. UEs 115, 415A, and 415B may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via UEs 115, 415A, and 415B. For example, the control information may be communicated suing MAC-CE transmissions, RRC transmissions, DCI (downlink control information) transmissions, UCI (uplink control information) transmissions, SCI (sidelink control information) transmissions, another transmission, or a combination thereof.

UE 115 can include a variety of components (e.g., structural, hardware components) used for carrying out one or more functions described herein. For example, these components can includes processor 402, memory 404, transmitter 410, receiver 412, encoder, 413, decoder 414, medium contention manager 415, HARQ manager 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store range condition data 406, quality condition data 408, detection mode data 442, HARQ settings data 444, or a combination thereof, as further described herein.

The range condition data 406 includes or corresponds to data associated with or corresponding to range conditions for medium contention operations. For example, the range condition data 406 may include range conditions for detecting a medium contention event, a particular type of medium contention event (e.g., half-duplex or collision), range conditions for determining whether to transmit feedback, or a combination thereof. The range condition data 406 may include or correspond to distance thresholds or ranges or time delay thresholds or ranges for medium contention operations. The range conditions may be for or with respect to the receiving UE, the transmitting UEs, or both. For example, the range condition may include or correspond to a range from a receiving UE (e.g., radius condition). As another example, the range condition may include or correspond to a range between transmitting UEs (e.g., dthresh condition). The range condition data 406 may further include operations for determining or adjusting a range condition. For example, the range condition data 406 includes operations for determining a range condition based on one or more parameters, such as channel congestion.

The quality condition data 408 includes or corresponds to data associated with or corresponding to quality conditions for medium contention operations. For example, the quality condition data 408 may include quality conditions for detecting a medium contention event, quality conditions for detecting a particular type of medium contention event (e.g., half-duplex or collision), quality conditions for determining whether to transmit feedback, or a combination thereof. The quality conditions data 408 may include or correspond to received power thresholds or ranges or received quality thresholds or ranges for medium contention operations. For example, the quality conditions data 408 may utilize RSRP, RSRQ, Signal-to-interference-plus-noise ratio (SINR), etc. The quality condition data 408 may further include operations for determining or adjusting a quality condition. For example, the quality condition data 408 includes operations for determining a quality condition based on one or more parameters, such as channel congestion. To illustrate, the UE may utilize a channel busy ration (CBR) or retransmission rates for determining channel congestion, where retransmission rates may be indicated by upper layers of the network and where higher retransmission rates indicate greater congestion.

The detection mode data 442 includes or corresponds to data indicating or corresponding to a mode of operation for the medium contention operations. For example, the detection mode data 442 may include data indicating a particular medium contention operation type. The operation type may specify a particular type of medium contention event (e.g., collision) to monitor. Additionally, or alternatively, the operation type may specify to use a condition or conditions to determine whether to perform detection or whether to engage in mitigation operations (e.g., send HARQ feedback). As an illustrative example, the mode may indicate to use a range condition for determining whether to monitor for medium contention events and indicate to use a quality condition (e.g., received power) for determining whether to perform mitigation (e.g., send HARQ feedback). As another illustrative example, the mode may indicate to use a first range condition for determining whether to monitor for medium contention events and indicate to use a second range condition for determining whether to perform mitigation (e.g., send HARQ feedback). In some such examples, the first range condition may be a distance from the UE (e.g., receiving UE), and the second condition may be a distance between the UEs of the medium contention event (e.g., transmitting UEs).

The HARQ settings data 444 includes or corresponds to data associated with enhanced HARQ feedback operations for sidelink communications. The HARQ settings data 444 may include one or more types of HARQ feedback operation modes and/or thresholds or conditions for switching between HARQ feedback modes and/or configurations. For example, the HARQ settings data 444 may have data indicating different thresholds for different HARQ feedback modes, such as single or multiple HARQ timeline modes and/or FBE and non-FBE modes.

The UE 115 may optionally include HARQ resource data, HARQ CAT data, CAT settings data, or a combination thereof. In some implementations, such data may be included in the HARQ settings data 444. The HARQ resource data includes or corresponds to data associated with or corresponding to resources used for HARQ feedback transmissions. For example, the HARQ resource data may indicate candidate resources (e.g., available resources) for a HARQ feedback transmission. The HARQ resource data may also include thresholds or data used to evaluate whether to send one or multiple HARQ feedback transmissions, such as conditions for determining whether to send multiple feedback transmissions and/or for selecting transmission resources from the candidate resources.

The HARQ CAT data includes or corresponds to data indicating or corresponding to a CAT operation type for HARQ feedback transmissions. For example, the HARQ CAT data may include data indicating a particular CAT operation type for one or more HARQ feedback transmissions. The HARQ CAT data may also include parameters or settings for determining and/or selecting or prioritizing CAT operation types. For example, the HARQ CAT data may include network configured or pre-configured settings for CAT operation type determination.

The CAT settings data includes or corresponds to data associated with enhanced CAT operation determination operations for HARQ feedback. The CAT settings data may include one or more types of CAT operation modes and/or thresholds or conditions for switching between CAT operation modes and/or configurations. For example, the CAT settings data may have data indicating different thresholds for different CAT operation modes, such as network signaled or gap based CAT operation determination modes.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. Medium contention manager 415 may be configured to determine and perform medium contention operations, such as for half-duplex and/or collision events. For example, medium contention manager 415 is configured to determine when to perform medium contention discovery operations, when to perform medium contention mitigation operations, or both. As another example, medium contention manager 415 is configured to determine whether to perform selective discovery or selective feedback operations. In some implementations, the medium contention manager 415 is configured to determine what medium contention mode to operate in.

HARQ manager 416 may be configured to determine and perform HARQ feedback operations. For example, HARQ manager 416 is configured to determine what resource or resources to use for HARQ feedback, such as when and where to perform feedback transmission, for the medium contention operations. As another example, HARQ manager 416 is configured to determine whether to perform one feedback transmission or multiple feedback transmissions, such as first and second feedback transmissions. In some implementations, the HARQ manager 416 is configured to determine whether to perform any CAT operations for transmission of the HARQ feedback. In implementations, where a CAT operation is to be performed, the HARQ manager 416 may be configured to determine what type of CAT operation to perform.

UEs 415A and 415B include processor 430, memory 432, transmitter 434, receiver 436, encoder 437, decoder 438, medium contention manager 439, HARQ manager 440, and antennas 234a-t. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store range condition data 406, quality condition data 408, detection mode data 442, HARQ settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, UEs 415A and 415B may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of UE 115 described with reference to FIG. 2.

Encoder 437, and decoder 438 may include the same functionality as described with reference to encoder 413 and decoder 414, respectively. Medium contention manager 439 may include similar functionality as described with reference to medium contention manager 415. HARQ manager 440 may include similar functionality as described with reference to HARQ manager 416.

During operation of wireless communications system 400, UE 415A may determine that UE 115 has enhanced HARQ feedback operation capability. For example, UE 115 may transmit a message 448 that includes an enhanced resource reservation indicator 490 (e.g., a HARQ feedback for sidelink channel indicator). Indicator 490 may indicate enhanced HARQ feedback operation capability for unlicensed spectrum and/or sidelink channel operations or a particular type or mode of HARQ feedback operation. In some implementations, a network entity (e.g., a network entity 405) or UE 415A/B sends control information to indicate to UE 115 that enhanced HARQ feedback operation and/or a particular type of enhanced HARQ feedback operation is to be used. For example, in some implementations, message 448 (or another message, such as configuration transmission 450) is transmitted by the UE 415A/B or the network entity 405. The configuration transmission 450 may include or indicate to use enhanced HARQ feedback operations or to adjust or implement a setting of a particular type of enhanced HARQ feedback operation. For example, the configuration transmission 450 may include detection mode data 442, as indicated in the example of FIG. 4, HARQ settings data 444, or both.

During operation, devices of wireless communications system 400, perform enhanced medium contention operations. For example, the UEs 115, 415A, 415B exchange transmissions via a sidelink channel. In the example of FIG. 4, the UE 415A transmits a first sidelink channel transmission 452 and the UE 415B transmits a second sidelink channel transmission 454 at least partially concurrently.

The sidelink channel transmissions 452, 454 may be signaled by corresponding sidelink channel control messages (not shown). The sidelink channel control messages may include or indicate a particular resource selected by the UE 415A/B for a data channel transmission. To illustrate, the UE 415A may send a SCI message indicating a sidelink channel data transmission, such as a sidelink channel data transmission 452.

The UE 115 may attempt to receive or receive the sidelink channel control messages and/or sidelink channel data transmissions 452, 454 and may determine a medium contention event based on the messages and/or transmission occupying the same transmission resource or same time resource (e.g., same slot). The sidelink channel data transmissions 452, 454 may be transmitted in the same slot as the sidelink channel control messages.

In one example, the UE 115 determines whether or not to perform medium contention detection based on one or more conditions. In a particular implementation, the UE 115 uses a range condition or quality condition to evaluate if the UE 115 should perform medium contention detection for the UE 415A, the UE 415B, or both.

Additionally or alternatively, the UE 115 determines whether or not to perform medium contention mitigation based on one or more conditions. For example, the UE 115 uses a range condition or quality condition to evaluate if the UE 115 should transmits medium contention event feedback for the UE 415A, the UE 415B, or both. In some such implementations, the UE 115 may determine whether to perform medium contention mitigation operations in addition to or in the alternative of determining whether or not to perform medium contention detection based on one or more other conditions. Such selective detection/determination and selective feedback operations are described further with reference to FIGS. 7 and 8. In addition, additional examples and details on particular conditions are described further with reference to FIGS. 5 and 6.

After determining to perform medium contention mitigation (e.g., feedback transmission), the UE 115 determines resources for HARQ feedback transmission or transmissions based on the sidelink channel data transmissions 452, 454 and optionally settings information, such as HARQ settings data 444. For example, the UE 115 may receive the sidelink channel data transmission 452 and may determine the resources for HARQ feedback transmission based on one or more HARQ timelines. The UE 115 may then transmit one or more feedback transmissions in the one or more determined resources. For example, the UE 115 may transmit a negative acknowledgment (NACK) transmission. In some such implementations, the feedback transmission (e.g., HARQ transmission) includes additional information. To illustrate, the HARQ transmission may indicate a medium contention event or a particular medium contention event (e.g., half-duplex or collision). Additionally, or alternatively, the HARQ transmission may indicate a mitigation operation (e.g., timing or slot format adjustment, transmission power adjustment, etc.) or identify the UEs so that the UEs or network may determine a mitigation operation or operations.

The UE 115 may determine whether it is clear to transmit a feedback transmission in a particular resource of the one or more determined resources based on HARQ settings and/or CAT settings. The UE 115 may then transmit a sidelink channel HARQ feedback transmission in the particular resource after successfully performing a channel access operations. To illustrate, the UE 115 may transmit a first sidelink channel HARQ feedback transmission 456 based on performing a first channel access operation.

In some implementations, the UE 115 may transmit a second sidelink channel HARQ feedback transmission 458. For example, the UE 115 may transmit the second sidelink channel HARQ feedback transmission 458 to the UE 415B if the first sidelink channel HARQ feedback transmission 456 was transmitted to the UE 415A. As another example, the UE 115 may transmit (e.g., groupcast or broadcast) the second sidelink channel HARQ feedback transmission 458 after failing to transmit the first sidelink channel HARQ feedback transmission 456 or after successfully transmitting the first sidelink channel HARQ feedback transmission 456 for redundancy. Additionally, UEs 115, 415A and 415B may determine a CAT operation or operations for the HARQ feedback transmission or transmissions based on a control message and optionally settings information, such as HARQ settings data 444.

Accordingly, the UEs 115, 415A and 415B may be able to more efficiently perform medium contention operations. Thus, FIG. 4 describes enhanced medium contention feedback operations. Using enhanced medium contention operations may enable improvements when operating in resource reservation modes and/or performing sidelink channel communications. Performing enhanced medium contention operations enable reduced bandwidth/spectrum waste when performing contention operations and thus, enhanced UE and network performance by increasing throughput and reducing latency.

Figure 5:
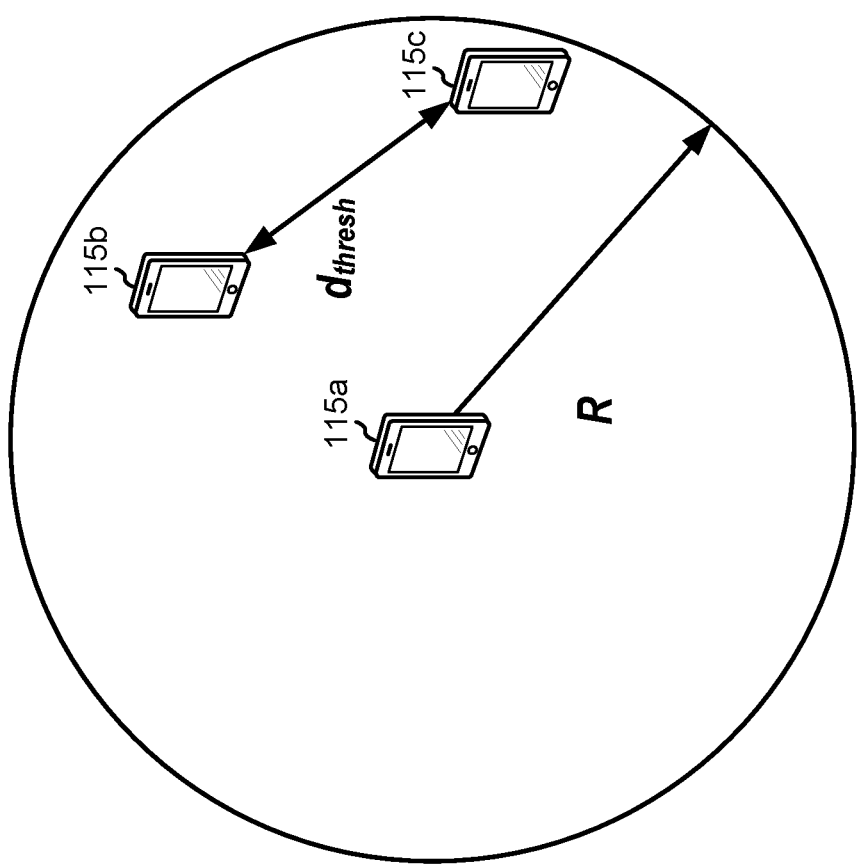
FIG. 5 is a diagram illustrating an example diagram for range conditions according to some embodiments of the present disclosure.

FIG. 5 is a diagram illustrating an example diagram for range conditions. In FIG. 5, a diagram depicting multiple UEs and distances types is illustrated. Specifically, three UEs are illustrated and two different types of distances are illustrated. The three UEs include a first UE 115a (e.g., receive UE) and two transmit UEs, a second UE 115b and a third UE 115c. The two types of distances include a distance (e.g., radius) between a receiving UE (e.g., 115a) and a transmitting UE (e.g., 115b or 115c) and a distance between two transmitting UEs (e.g., dinter), such as between UEs 115b and 115c. Additionally, or alternatively, multiple different distance thresholds may be used for different medium contention events. For example, a first distance threshold (e.g., dhalf) may be used for half-duplex detection and a second distance threshold (e.g., dcoll) may be used for collision detection. Such specific medium contention event range/distance thresholds may be of a radius type or an intermediate type. To illustrate, a range/distance threshold used for half-duplex may be a radius type and the range/distance threshold used for collisions may be an intermediate type.

Figure 6:
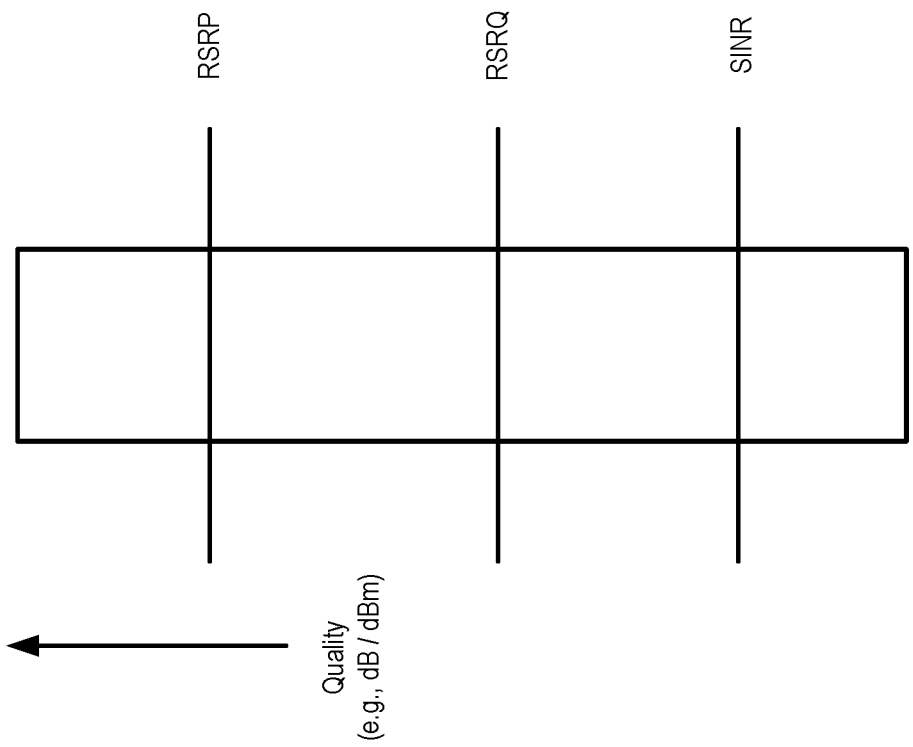
FIG. 6 is a diagram illustrating an example diagram for quality conditions according to some embodiments of the present disclosure.

FIG. 6 is a diagram illustrating an example diagram for quality conditions. In FIG. 6, a quality condition diagram is illustrated with various quality conditions. Specifically, threshold values for quality conditions of RSRP, RSRQ, and SINR are shown. As illustrated in FIG. 6, different quality conditions may have different values. In some implementations, a UE may use one quality condition. In other implementations, a UE may use multiple quality conditions. For example, a first quality threshold (e.g., RSRQ) may be used for half-duplex detection and a second quality threshold (e.g., RSRP) may be used for collision detection. As another example, a first quality threshold value of a first type (e.g., RSRP) may be used for half-duplex detection and a second quality threshold value of the first type (e.g., RSRP) may be used for collision detection. As yet another example, a first quality threshold (e.g., RSRP) may be used for UEs within a first distance/range and a second quality threshold (e.g., RSRP or SINR) may be used for UEs within a second distance/range. As yet another example, a first quality threshold (e.g., RSRP) and a second quality threshold (e.g., RSRP or SINR) may be used and both have to satisfied for detection or feedback, as described further with reference to FIGS. 7 and 8.

The RSRP condition may include a RSRP condition, a RSRP similarity condition, or a RSRP range condition. A RSRP condition may include a RSRP condition (e.g., dBm threshold) for received sidelink communications from a particular transmit UE, a RSRP similarity condition may include a RSRP difference or delta threshold for RSRPs for received sidelink communications between two transmitting UEs, and a RSRP range condition may include a RSRP condition (e.g., dBm threshold) that is based on a range of the transmitting UE.

Figures 7, 8:
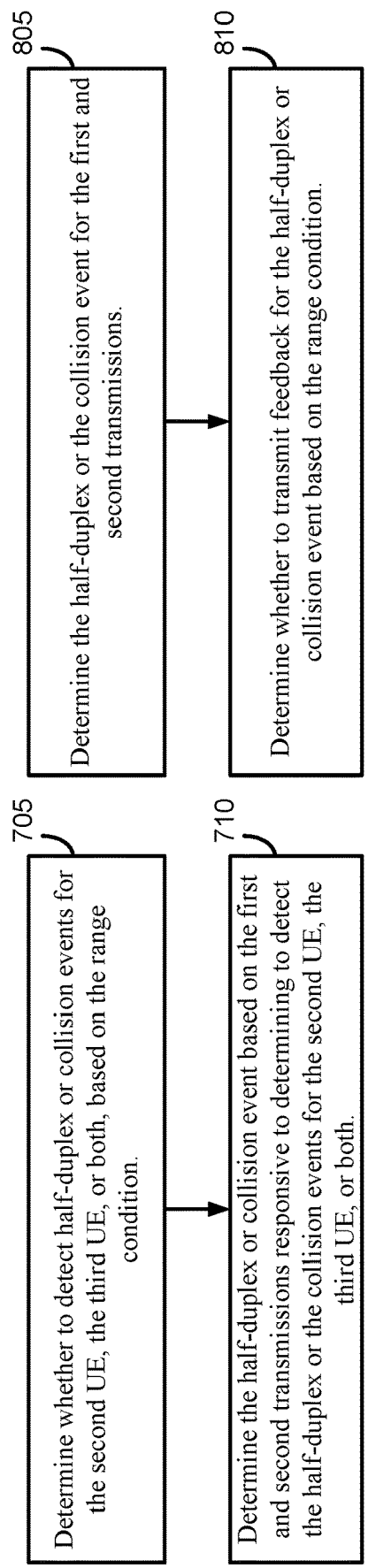
FIG. 7 is a diagram illustrating an example of selective determination operations according to some embodiments of the present disclosure.
FIG. 8 is a diagram illustrating an example of selective feedback operations according to some embodiments of the present disclosure.

FIGS. 7 and 8 are diagrams illustrating examples of enhanced medium contention operations. In FIGS. 7 and 8, examples of medium contention detection and mitigation are illustrated. FIG. 7 is a diagram showing selective medium contention event detection, and FIG. 8 is a diagram showing selective medium contention event feedback transmission. Specifically, any of the previously described conditions (e.g., range, quality, or both) can be used for the selective operations of FIGS. 7 and 8.

Referring to FIG. 7, a flow diagram illustrating an example of selective medium contention event detection is shown. In FIG. 7, a flow diagram illustrating example operations for determining whether or not to perform medium contention event detection based on a condition is illustrated. Specifically, in the example of FIG. 7, medium contention event detection is based on a range condition. In other implementations, the medium contention event detection may be determined based further on one or more other conditions, such as additional range conditions or quality conditions. Alternatively, the medium contention event detection may be determined based on a quality condition or conditions, and independent of a range condition.

In the example of FIG. 7, a UE determines whether to detect medium contention events for the second UE, the third UE, or both, based on a range condition (e.g., dcoll or dinter satisfying a threshold condition or range), at 705. For example, the UE may determine to detect medium contention events between the UE and one or more other UEs based on a distance (dcoll) between the UE and the one or more other UEs and/or may determine to detect medium contention events between one or more groups of other UEs based on a distance (dinter) between the other UEs.

The UE determines the medium contention event based on the first and second transmissions responsive to determining to detect the medium contention events for the second UE, the third UE, or both, at 710. For example, the UE determines a particular medium contention event for a particular pair of UEs after previously determining to detect or monitor one or more of such UEs for medium contention events.

Thus, the UE filters the medium contention event detection based on a condition (e.g., a range condition). Accordingly, the UE may be able to selectively determine whether to engage in medium contention event detection (and thus feedback or selective feedback) in certain situations and/or conditions when medium contention event feedback is likely to help mitigate the medium contention event and/or when the medium contention event is causing a reduction in network performance. The UE may determine to not perform medium contention event detection (and thus feedback or selective feedback) in certain situations and/or conditions when the medium contention event feedback is not likely to help mitigate the medium contention event and/or when the medium contention event is not causing a reduction in network performance or not causing a reduction in network performance above a threshold amount.

Referring to FIG. 8, a flow diagram illustrating an example of selective medium contention event feedback transmission is shown. In FIG. 8, a flow diagram illustrating example operations for determining whether or not to transmit medium contention event feedback based on a condition is illustrated. Specifically, in the example of FIG. 8, medium contention event feedback transmission is based on a range condition. In other implementations, the medium contention event feedback transmission may be determined based further on one or more other conditions, such as additional range conditions or quality conditions. Alternatively, the medium contention event feedback transmission may be determined based on a quality condition or conditions, and independent of a range condition.

In the example of FIG. 8, a UE determines the medium contention event for the first and second transmissions, at 805. The UE may determine the medium contention event independent of a condition, such as independent of a range condition, independent of a quality condition, or independent of both. Additionally, the UE may determine whether to look for medium contention events based on a setting, such as medium contention event detection enabled setting. The setting may be adjusted by the UE, the network, or both.

The determines whether to transmit feedback for the medium contention event based on the range condition, at 810. For example, the UE determines whether or not to transmit feedback for a determined medium contention event based on a range condition (e.g., dcoll or dinter satisfying a threshold condition or range). To illustrate, the UE may determine to send feedback to both UEs based on a distance between the UEs (dinter) satisfying a corresponding condition. As another illustration, the UE may determine to send feedback to one UE based on a distance between the UE and the one other UE (dcoll) satisfying a corresponding condition and a distance between the UE and the second other UE not satisfying the corresponding condition.

Thus, the UE filters the feedback transmission based on a condition (e.g., a range condition). Accordingly, the UE may be able to selectively provide feedback in certain situations and/or conditions when the feedback is likely to help mitigate the medium contention event and/or when the medium contention event is causing a reduction in network performance. The UE may determine to not transmit feedback in certain situations and/or conditions when the feedback is not likely to help mitigate the medium contention event and/or when the medium contention event is not causing a reduction in network performance or not causing a reduction in network performance above a threshold amount.

As an illustrative, non-limiting example, the receiving UE (e.g., 115) may consider other UEs for half duplex detection if the one or more of the UEs are within a given range (R) from the UE, the RSRP of the other UEs are above a threshold, or both. The UE may determine the distance information of the other UEs based on decoded SCI transmissions from the other UEs. For example, the UE may use a zone-ID or timing advance value to determine the distance. Additionally, or alternatively, the UE may selectively transmit the feedback if the two UEs are also no more than a threshold distance apart (e.g., dthresh).

In some implementations, the threshold distance apart (intermediate distance) may be set by the network or region, semi-statically configured by a network, determined/adjusted by the UE, or a combination thereof. For example, the UE may determine the threshold or adjust a network configured threshold based on channel congestion. The UE may determine the channel congestion from a channel busy ratio or its own retransmission rate, with higher rates implying greater congestion. Alternatively, the channel congestion may be monitored by the network and indicated by upper layers of the network.

Additionally, or alternatively, the receiving UE (e.g., 115) may consider other UEs for half duplex detection if the RSRP from two UEs are within x-dB from each other. Using such a quality condition may reduce or eliminate some false detection cases or false alarm cases due to distance quantization errors.

The receiving UE (e.g., 115) may consider other UEs for collision detection if one or more other UEs are within a distance range (R2) from the receiving UE. Additionally, or alternatively, the receiving UE (e.g., 115) may consider other UEs for collision detection if a received RSRP for one or more other UEs is above a threshold RSRP. The RSRP threshold may also be determined or adjusted based on network load/channel congestion.

The receiving UE may detect a collision when two UEs transmit at the same time and have some or all of their transmissions on overlapping frequency resources. In some implementations, the receiving UE may detect a collision from any such overlap. In other implementations, the receiving UE may detect a collision if a subchannel containing an SCI of a transmitter overlaps with interferer RB allocation. In such implementations, the subchannel may contain a SCI1 only or both SCI1 and SCI2. Such may reduce false alarms/false positives because if there is no overlapping subchannel containing an SCI, a receiver should be able to decode the SCIs and send a NACK by itself.

The receiving UE may send feedback (e.g., a NACK) if both transmit UEs are within a certain range/radius from the UE (dcoll), and/or, when the inter-UE distance between the two transmits UEs is below a distance threshold (dinter). Additionally, or alternatively, receiving UE may send feedback if RSRPs received from both transmit UEs are within X dB of each other, and/or when the RSRPs received from both transmit UEs satisfy a condition (e.g., range).

The threshold can be based on a data decode SINR requirement (MCS dependent), a SCI1 decode SINR requirement, a SCI1 and SCI2 decode SINR requirement (MCS dependent), or a combination thereof.

In some implementations, the receiving UE may be configured to perform medium contention feedback operations for all medium contention events, or only some medium contention events. For example, the receiving UE may only perform half-duplex mitigation, only perform collision mitigation, or both. The receiving UE may be semi-statically configured for such operations, or the receiving UE may determine such operations based on UE capability, network load, traffic type, other factors, or a combination thereof.

Additionally, or alternatively, one or more operations of FIGS. 4-8 may be added, removed, substituted in other implementations. For example, in some implementations, the example conditions of FIGS. 5 and 6 may be used together. To illustrate, the range conditions of FIG. 5 may be used with the quality conditions of FIG. 6. As another example, the steps of FIGS. 7 and 8 may be used together. To illustrate, the selective detection operations of FIG. 7 may be used with the selective feedback operations of FIG. 8.

Figure 11:
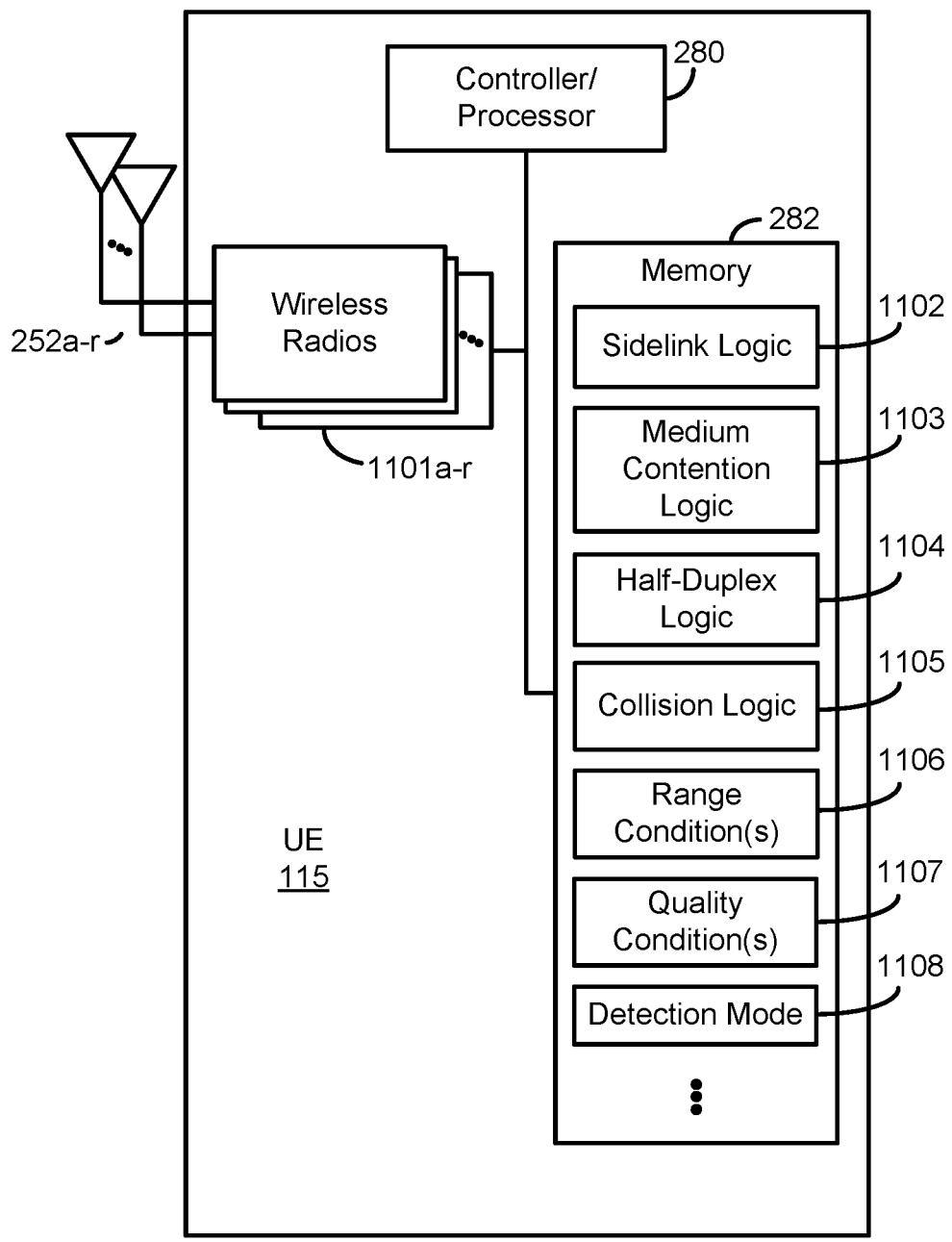
FIG. 11 is a block diagram conceptually illustrating a design of a UE configured to perform precoding information update operations according to some embodiments of the present disclosure.

FIG. 9 is a flow diagram illustrating example blocks executed by a UE configured according to an aspect of the present disclosure. The example blocks will also be described with respect to UE 115 as illustrated in FIG. 11. FIG. 11 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1101a-r and antennas 252a-r. Wireless radios 1101a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 11, memory 282 stores sidelink logic 1102, medium contention logic 1103, half-duplex logic 1104, collision logic 1105, range condition data 1106, quality condition data 1107, and detection mode data 1108.

At block 900, a wireless communication device, such as a UE, receives a first transmission from a second UE for a NR sidelink channel. For example, the UE 115 (e.g., first UE) is operating in a sidelink communication mode and receives a sidelink transmission, as described with reference to FIGS. 4-8. The sidelink transmission may include or correspond to a PSCCH transmission and/or a PSSCH transmission from another UE (e.g., a second UE).

At block 901, the UE 115 receives a second transmission from a third UE for the NR sidelink channel. For example, the UE 115 is operating in a sidelink communication mode and receives a second sidelink transmission, as described with reference to FIGS. 4-8. The second sidelink transmission may include or correspond to a PSCCH transmission and/or a PSSCH transmission from a second other UE (e.g., a third UE).

In some implementations, the UE 115 optionally determines a second slot of the sidelink channel (in licensed or unlicensed/shared spectrum) to transmit HARQ feedback for the sidelink transmission, as described with reference to FIGS. 4-8. To illustrate, the UE 115 may determine two resources (e.g., slots) based on two HARQ timelines (two HARQ feedback timing gaps) which are configured for the UE 115 and/or the sidelink transmission. The UE 115 may select an earliest resource of the two resources in a particular implementation.

Optionally, at block 902, the UE 115 may determine a medium contention event for the first and second transmissions of the NR sidelink channel based on a range condition in some implementations. For example, the UE 115 determines a particular medium contention event for the sidelink transmissions, as described with reference to FIGS. 4-8. To illustrate, the UE 115 may determine to detect one or more medium contention events based on a location of the second UE, the third UE, or both. For example, the UE may determine distance information from SCI transmission from the other UEs to determine a range to the other UEs or a distance between the other UEs. Based on this distance or distances, the UE 115 may determine to determine whether a half-duplex or collision event occurred. Additionally or alternatively, the UE 115 may determine to whether to transmit feedback after determining a medium contention event based on a range condition. To illustrate, the UE 115 may determine to detect one or more medium contention operations based on a detection mode setting, and the UE 115 may determine whether to send a NACK based on the range to the other UEs or the distance between the other UEs.

Once the UE has determined to detect or monitor for medium contention events, the UE 115 may monitor for transmissions on the same time and/or frequency resources to determine a medium contention event as described with reference to FIGS. 4-8. For example, the UE 115 may determine whether transmissions overlap in time and frequency to determine a collision event.

At block 903, the UE 115 transmits a feedback transmission based on determining the medium contention event based on the range condition. For example, the UE 115 transmits the HARQ feedback transmission in the second slot based on a distance to one or more of the UEs or a distance between the UEs satisfying the range condition, and optionally responsive to successfully performing the CA operation, as described with reference to FIGS. 4-8. Based on configurations, the UE 115 may attempt to transmit one or more HARQ feedback transmission in some implementations. For example, when the HARQ feedback transmission is sent to/intended for the second UE, and the UE 115 transmits a second HARQ feedback transmission in the second slot or a third slot to the third UE, as described with reference to FIGS. 4-8.

In some implementations, the UE 115 optionally determines a particular CA operation for the HARQ feedback transmission for the sidelink transmission, as described with reference to FIGS. 4-8. To illustrate, the UE 115 may determine a particular CA operation based on a received sidelink communication and/or network settings.

The UE 115 may execute additional blocks (or the UE 115 may be configured further perform additional operations) in other implementations. For example, the UE 115 may perform one or more operations described above. As another example, the UE 115 may perform one or more aspects as presented below.

In a first aspect, determining the medium contention event based on the range condition includes: determining the medium contention event for the first and second transmissions; and determining whether to transmit feedback for the medium contention event based on the range condition.

In a second aspect, alone or in combination with the first aspect, determining the medium contention event based on the range condition includes: determining whether to detect medium contention events for the second UE, the third UE, or both, based on the range condition (e.g., dcoll or dinter satisfying threshold); and determining the medium contention event based on the first and second transmissions responsive to determining to detect the medium contention events for the second UE, the third UE, or both.

In a third aspect, alone or in combination with one or more of the above aspects, the medium contention event comprises a half-duplex event (e.g., half-duplex operation, also referred to as a half-duplex operation event) or a collision event.

In a fourth aspect, alone or in combination with one or more of the above aspects, the feedback transmission includes or corresponds to a negative acknowledgment (NACK), the NACK configured to trigger a retransmission of the first transmission or the second transmission, and the feedback transmission is transmitted to the second UE or the third UE.

In a fifth aspect, alone or in combination with one or more of the above aspects, the UE 115 transmits a second feedback transmission based on determining the medium contention event based on the range condition, where the second feedback transmission includes or corresponds to a second NACK configured to trigger a second retransmission of the other of the first transmission or the second transmission, and where the feedback transmission is transmitted to the other of the second UE or the third UE.

In a sixth aspect, alone or in combination with one or more of the above aspects, the medium contention event includes a half-duplex operation event, and where the half-duplex operation event corresponds to two or more UEs transmitting at the same time (e.g., without overlap of transmission resources).

In a seventh aspect, alone or in combination with one or more of the above aspects, the medium contention event includes a collision event, and where the collision event corresponds to two or more UEs transmitting at the same time with at least a partial overlap of transmission resources.

In an eighth aspect, alone or in combination with one or more of the above aspects, the overlap of transmission resources corresponds to a subchannel overlap for a control transmission which interferes with resource block allocation.

In a ninth aspect, alone or in combination with one or more of the above aspects, the subchannel overlap corresponds to a subchannel for a SCI1 transmission.

In a tenth aspect, alone or in combination with one or more of the above aspects, the subchannel overlap corresponds to a subchannel for both SCI1 and SCI2 transmissions.

In an eleventh aspect, alone or in combination with one or more of the above aspects, the first and second transmissions includes or corresponds to SCI transmissions, and the UE 115 further: decodes the SCI transmissions to determine transmission resources for the first and second transmissions, where determining the medium contention event is further based on the determined transmission resources.

In a twelfth aspect, alone or in combination with one or more of the above aspects, the UE 115 monitors for first and second data transmissions based on the determined transmission resources of the SCI transmissions; and attempts to decode the first and second data transmissions prior to determining the medium contention event.

In a thirteenth aspect, alone or in combination with one or more of the above aspects, the UE 115 determines a parameter of the network; compares the parameter to an adjustment condition; and adjusts the range condition based on the parameter satisfying the adjustment condition.

In a fourteenth aspect, alone or in combination with one or more of the above aspects, the UE 115 receives a RRC message from a network entity; and adjusts the range condition based on the RRC message.

In a fifteenth aspect, alone or in combination with one or more of the above aspects, the range condition includes or corresponds to a range condition between a transmitting UE and a receiving UE or corresponds to a range condition between two transmitting UEs.

In a sixteenth aspect, alone or in combination with one or more of the above aspects, the UE 115 determines the medium contention event further based on a second range condition, where the first range condition includes or corresponds to a range condition between a transmitting UE and a receiving UE, and where the second range condition includes or corresponds to a range condition between two transmitting UEs.

In a seventeenth aspect, alone or in combination with one or more of the above aspects, the UE 115 determines the medium contention event further based on a quality condition.

In an eighteenth aspect, alone or in combination with one or more of the above aspects, the quality condition includes or corresponds to a RSRP condition or a SINR condition.

In a nineteenth aspect, alone or in combination with one or more of the above aspects, the quality condition includes or corresponds to a RSRP similarity condition or a RSRP range condition.

In a twentieth aspect, alone or in combination with one or more of the above aspects, the UE 115 determines a parameter of the network; compares the parameter to an adjustment condition; and adjusts the quality condition based on the parameter satisfying the adjustment condition.

In a twenty-first aspect, alone or in combination with one or more of the above aspects, the adjustment condition is a data decode SINR condition, a SCI decode condition, or a SCI1 and SCI 2 decode condition.

In a twenty-second aspect, alone or in combination with one or more of the above aspects, the UE 115 receives a RRC message from a network entity; and adjusts the quality condition based on the RRC message.

In a twenty-third aspect, alone or in combination with one or more of the above aspects, the UE 115 determines the medium contention event further based on a first quality condition and a second quality condition, where the first quality condition includes or corresponds to a RSRP similarity condition, and where the second quality condition includes or corresponds to a RSRP range condition.

In a twenty-fourth aspect, alone or in combination with one or more of the above aspects, prior to receiving the first transmission: the UE 115 determines a medium contention event detection mode, where the medium contention event detection mode includes half-duplex detection, collision detection, or both.

In a twenty-fifth aspect, alone or in combination with one or more of the above aspects, determining the medium contention event detection mode includes: determining the medium contention event detection mode based on UE capability, network load, a traffic type, or a combination thereof.

In a twenty-sixth aspect, alone or in combination with one or more of the above aspects, determining the medium contention event detection mode includes: receiving a RRC message indicating the medium contention event detection mode; and determining the event detection mode based on the medium contention event detection mode indicated by the RRC message.

In a twenty-seventh aspect, alone or in combination with one or more of the above aspects, the first transmission includes a zone identifier (zone-ID) for the second UE, and the UE 115 further: determines a distance between the first UE and the second UE based on the zone-ID, where determining the medium contention event includes comparing the distance to the range condition to determine the medium contention event.

In a twenty-eighth aspect, alone or in combination with one or more of the above aspects, the first transmission includes a first zone identifier (zone-ID) for the second UE, where the second transmission includes a second zone-ID for the third UE, and the UE 115 further: determines a first distance between the first UE and the second UE based on the first zone-ID; and determines a second distance between the second UE and the third UE based on the first zone-ID, where determining the medium contention event includes comparing the first distance to the range condition and the second distance to the range condition to determine the medium contention event, and where either or both of the first distance and second distance satisfy the range condition.

In a twenty-ninth aspect, alone or in combination with one or more of the above aspects, the first transmission includes a first zone identifier (zone-ID) for the second UE, where the second transmission includes a second zone-ID for the third UE, and the UE 115 further: determines a distance between the second UE and the third UE based on the first and second zone-IDs, where determining the medium contention event includes comparing the distance to the range condition to determine the medium contention event.

In a thirtieth aspect, alone or in combination with one or more of the above aspects, the UE 115 determines a distance between the first UE and the second UE based on a zone-ID, a timing advance value, or a combination thereof, where the distance is compared to the range condition.

In a thirty-first aspect, alone or in combination with one or more of the above aspects, the UE 115 determines a distance between the second UE and the third UE based on a zone-ID, a timing advance value, or a combination thereof, where the distance is compared to the range condition.

Accordingly, a UE and a base station may perform enhanced medium contention operations. By performing enhanced medium contention operations, throughput and reliability may be increased and such operations may enable enhancements in sidelink operations and/or with reduced capability (e.g., less advanced) devices.

FIG. 10 is a flow diagram illustrating example blocks executed by a UE configured according to another aspect of the present disclosure. The example blocks will also be described with respect to UE 115 as illustrated in FIG. 11.

At block 1000, a wireless communication device, such as a UE, receives a first transmission from a second UE for a NR sidelink channel. For example, the UE 115 (e.g., first UE) is operating in a sidelink communication mode and receives a sidelink transmission, as described with reference to FIGS. 4-8. The sidelink transmission may include or correspond to a PSCCH transmission and/or a PSSCH transmission from another UE (e.g., a second UE).

At block 1001, the UE 115 receives a second transmission from a third UE for the NR sidelink channel. For example, the UE 115 is operating in a sidelink communication mode and receives a second sidelink transmission, as described with reference to FIGS. 4-8. The second sidelink transmission may include or correspond to a PSCCH transmission and/or a PSSCH transmission from a second other UE (e.g., a third UE).

In some implementations, the UE 115 optionally determines a second slot of the sidelink channel (in licensed or unlicensed/shared spectrum) to transmit HARQ feedback for the sidelink transmission, as described with reference to FIGS. 4-8. To illustrate, the UE 115 may determine two resources (e.g., slots) based on two HARQ timelines (two HARQ feedback timing gaps) which are configured for the UE 115 and/or the sidelink transmission. The UE 115 may select an earliest resource of the two resources in a particular implementation.

Optionally, at block 1002, the UE 115 may determine a medium contention event for the first and second transmissions of the NR sidelink channel based on a quality condition in some implementations. For example, the UE 115 determines a particular medium contention event for the sidelink transmissions, as described with reference to FIGS. 4-8. To illustrate, the UE 115 may determine to detect one or more medium contention events based on a link or transmission quality between the UE 115 and the second UE, the third UE, or both. For example, the UE may determine quality information from a SCI transmission or data transmission from the other UEs to determine a quality from the other UEs. Based on this quality or qualities, the UE 115 may determine to determine whether a half-duplex or collision event occurred. Additionally or alternatively, the UE 115 may determine to whether to transmit feedback after determining a medium contention event based on a quality condition. To illustrate, the UE 115 may determine to detect one or more medium contention operations based on a detection mode setting, and the UE 115 may determine whether to send a NACK based on the quality from the other UEs.

Once the UE has determined to detect or monitor for medium contention events, the UE 115 may monitor for transmissions on the same time and/or frequency resources to determine a medium contention event as described with reference to FIGS. 4-8. For example, the UE 115 may determine whether transmissions overlap in time and frequency to determine a collision event.

At block 1003, the UE 115 transmits a feedback transmission based on determining the medium contention event based on the quality condition. For example, the UE 115 transmits the HARQ feedback transmission in the second slot based on a quality from one or more of the UEs satisfying the quality condition, and optionally responsive to successfully performing the CA operation, as described with reference to FIGS. 4-8. Based on configurations, the UE 115 may attempt to transmit one or more HARQ feedback transmission in some implementations. For example, when the HARQ feedback transmission is sent to/intended for the second UE, and the UE 115 transmits a second HARQ feedback transmission in the second slot or a third slot to the third UE, as described with reference to FIGS. 4-8.

In some implementations, the UE 115 optionally determines a particular CA operation for the HARQ feedback transmission for the sidelink transmission, as described with reference to FIGS. 4-8. To illustrate, the UE 115 may determine a particular CA operation based on a received sidelink communication and/or network settings.

The UE 115 may execute additional blocks (or the UE 115 may be configured further perform additional operations) in other implementations. For example, the UE 115 may perform one or more operations described above or as described with reference to FIG. 7. As another example, the UE 115 may perform one or more aspects as presented below.

In a first aspect, determining the medium contention event based on the quality condition includes: determining the medium contention event for the first and second transmissions; and determining whether to transmit feedback for the medium contention event based on the quality condition.

In a second aspect, alone or in combination with the first aspect, determining the medium contention event based on the quality condition includes: determining whether to detect medium contention events for the second UE, the third UE, or both, based on the quality condition; and determining the medium contention event based on the first and second transmissions responsive to determining to detect the medium contention events for the second UE, the third UE, or both.

In a third aspect, alone or in combination with one or more of the above aspects, the medium contention event comprises a half-duplex event or a collision event.

In a fourth aspect, alone or in combination with one or more of the above aspects, the feedback transmission includes or corresponds to a negative acknowledgment (NACK), the NACK configured to trigger a retransmission of the first transmission or the second transmission, and where the feedback transmission is transmitted to the second UE or the third UE.

In a fifth aspect, alone or in combination with one or more of the above aspects, the UE 115 transmits a second feedback transmission based on determining the medium contention event based on the quality condition, where the second feedback transmission includes or corresponds to a second NACK configured to trigger a second retransmission of the other of the first transmission or the second transmission, and where the feedback transmission is transmitted to the other of the second UE or the third UE.

In a sixth aspect, alone or in combination with one or more of the above aspects, the medium contention event includes a half-duplex operation event, and where the half-duplex operation event corresponds to two or more UEs transmitting at the same time.

In a seventh aspect, alone or in combination with one or more of the above aspects, the medium contention event includes a collision event, and where the collision event corresponds to two or more UEs transmitting at the same time with at least a partial overlap of transmission resources.

In an eighth aspect, alone or in combination with one or more of the above aspects, the overlap of transmission resources corresponds to a subchannel overlap for a control transmission which interferes with resource block allocation.

In a ninth aspect, alone or in combination with one or more of the above aspects, the subchannel overlap corresponds to a subchannel for a SCI1 transmission.

In a tenth aspect, alone or in combination with one or more of the above aspects, the subchannel overlap corresponds to a subchannel for both SCI1 and SCI2 transmissions.

In an eleventh aspect, alone or in combination with one or more of the above aspects, the first and second transmissions include or correspond to SCI transmissions, and the UE 115 further: decodes the SCI transmissions to determine transmission resources for the first and second transmissions, where determining the medium contention event is further based on the determined transmission resources.

In a twelfth aspect, alone or in combination with one or more of the above aspects, the UE 115 monitors for first and second data transmissions based on the determined transmission resources of the SCI transmissions; and attempts to decode the first and second data transmissions prior to determining the medium contention event.

In a thirteenth aspect, alone or in combination with one or more of the above aspects, the UE 115 determines a parameter of the network; compares the parameter to an adjustment condition; and adjusts the quality condition based on the parameter satisfying the adjustment condition.

In a fourteenth aspect, alone or in combination with one or more of the above aspects, the UE 115 receives a RRC message from a network entity; and adjusts the quality condition based on the RRC message.

In a fifteenth aspect, alone or in combination with one or more of the above aspects, the quality condition includes or corresponds to a RSRP condition or a SINR condition.

In a sixteenth aspect, alone or in combination with one or more of the above aspects, the quality condition includes or corresponds to a RSRP similarity condition or a RSRP range condition.

In a seventeenth aspect, alone or in combination with one or more of the above aspects, the UE 115 determines the medium contention event further based on a second range condition, where the quality condition includes or corresponds to a RSRP similarity condition, and where the second quality condition includes or corresponds to a RSRP range condition.

In an eighteenth aspect, alone or in combination with one or more of the above aspects, the UE 115 determines a parameter of the network; compares the parameter to an adjustment condition; and adjusts the quality condition based on the parameter satisfying the adjustment condition.

In a nineteenth aspect, alone or in combination with one or more of the above aspects, the adjustment condition is a data decode SINR condition, a SCI decode condition, or a SCI1 and SCI 2 decode condition.

In a twentieth aspect, alone or in combination with one or more of the above aspects, the UE 115 receives a RRC message from a network entity; and adjusts the quality condition based on the RRC message.

In a twenty-first aspect, alone or in combination with one or more of the above aspects, the UE 115 determines the medium contention event further based on a range condition.

In a twenty-second aspect, alone or in combination with one or more of the above aspects, the range condition includes or corresponds to a range condition between a transmitting UE and a receiving UE or corresponds to a range condition between two transmitting UEs.

In a twenty-third aspect, alone or in combination with one or more of the above aspects, the UE 115 determines the medium contention event further based on a first range quality condition and a second range condition, where the first range condition includes or corresponds to a range condition between a transmitting UE and a receiving UE, and where the second range condition includes or corresponds to a range condition between two transmitting UEs.

In a twenty-fourth aspect, alone or in combination with one or more of the above aspects, prior to receiving the first transmission: the UE 115 determines a medium contention event detection mode, where the medium contention event detection mode includes half-duplex detection, collision detection, or both.

In a twenty-fifth aspect, alone or in combination with one or more of the above aspects, determining the medium contention event detection mode includes: determining the medium contention event detection mode based on UE capability, network load, a traffic type, or a combination thereof.

In a twenty-sixth aspect, alone or in combination with one or more of the above aspects, determining the medium contention event detection mode includes: receiving a RRC message indicating the medium contention event detection mode; and determining the event detection mode based on the medium contention event detection mode indicated by the RRC message.

In a twenty-seventh aspect, alone or in combination with one or more of the above aspects, determining a quality between the first UE and the second UE based the first transmission, where determining the medium contention event includes comparing the quality to the quality condition to determine the medium contention event.

In a twenty-eighth aspect, alone or in combination with one or more of the above aspects, determining a second quality between the first UE and the third UE based the second transmission, where determining the medium contention event includes comparing the second quality to the quality condition to determine the medium contention event.

Accordingly, a UE and a base station may perform enhanced medium contention operations. By performing enhanced medium contention operations, throughput and reliability may be increased and such operations may enable enhancements in sidelink operations and/or with reduced capability (e.g., less advanced) devices.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to enhanced medium contention operations may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 7 and 8) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items may be employed by itself, or any combination of two or more of the listed items may be employed. For example, if a composition is described as containing components A, B, and/or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
receiving, by a first user equipment (UE), a first transmission from a second UE for a new radio (NR) sidelink channel;
receiving, by the first UE, a second transmission from a third UE for the NR sidelink channel; and
transmitting, by the first UE, a feedback transmission based on determining a medium contention event for the first and second transmissions of the NR sidelink channel, the medium contention event determined based on a range condition and based on a comparison of a reference signal receive power (RSRP) difference condition between the first and second transmissions and a RSRP difference value between the first and second transmissions.

2. The method of claim 1, further comprising:
determining the medium contention event for the first and second transmissions responsive to determining to detect for medium contention events for the second UE, the third UE, or both; and
determining, responsive to determining the medium contention event for the first and second transmissions, whether to transmit feedback for the determined medium contention event based on a second range condition or a quality condition.

3. The method of claim 1, wherein the medium contention event comprises a half-duplex event or a collision event, and wherein the RSRP difference condition corresponds to a RSRP difference threshold between two received transmissions.

4. The method of claim 1, wherein the feedback transmission includes or corresponds to a negative acknowledgment (NACK), the NACK configured to trigger a retransmission of the first transmission or the second transmission, and wherein the feedback transmission is transmitted to the second UE or the third UE, and further comprising:
transmitting, by the first UE, a second feedback transmission based on determining the medium contention event based on the range condition, wherein the second feedback transmission includes or corresponds to a second NACK configured to trigger a second retransmission of the other of the first transmission or the second transmission, and wherein the feedback transmission is transmitted to the other of the second UE or the third UE.

5. The method of claim 1, wherein the medium contention event includes a half-duplex operation event, and wherein the half-duplex operation event corresponds to two or more UEs transmitting at the same time.

6. The method of claim 1, wherein the medium contention event includes a collision event, and wherein the collision event corresponds to two or more UEs transmitting at the same time with at least a partial overlap of transmission resources.

7. The method of claim 6, wherein the at least partial overlap of transmission resources corresponds to a subchannel overlap for a control transmission which interferes with resource block allocation, and wherein the subchannel overlap corresponds to a subchannel overlap for a sidelink control information (SCI) transmission.

8. The method of claim 1, wherein the first and second transmissions includes or corresponds to sidelink control information (SCI) transmissions, and further comprising:
decoding, by the first UE, the SCI transmissions to determine transmission resources for the first and second transmissions, wherein determining the medium contention event is further based on the determined transmission resources;
monitoring, by the first UE, for first and second data transmissions based on the determined transmission resources of the SCI transmissions; and
attempting, by the first UE, to decode the first and second data transmissions prior to determining the medium contention event.

9. The method of claim 1, further comprising:
determining whether to detect medium contention events for the first transmission and the second transmission based on a resource overlap between the first transmission and the second transmission, wherein the medium contention event is determined based on the range condition and the RSRP difference condition.

10. The method of claim 1, further comprising:
determining the RSRP difference value between the first and second transmissions based on a first RSRP value for the first transmission and a second RSRP value for the second transmission; and
comparing the RSRP difference value between the first and second transmissions to the RSRP difference condition, wherein the medium contention event determined based in part on the RSRP difference satisfying the RSRP difference condition.

11. An apparatus configured for wireless communication, comprising:
at least one processor; and
a memory coupled to the at least one processor,
wherein the at least one processor is configured to:
receive a first transmission from a first user equipment (UE) for a new radio (NR) sidelink channel;
receive a second transmission from a second UE for the NR sidelink channel; and
transmit, by the first UE, a feedback transmission based determining on a medium contention event for the first and second transmissions of the NR sidelink channel, the medium contention event determined based on a range condition and based on a comparison of a reference signal receive power (RSRP) difference condition between the first and second transmissions and a RSRP difference value between the first and second transmissions.

12. The apparatus of claim 11, wherein the at least one processor is further configured to:
determine a parameter of a network;
compare the parameter to an adjustment condition; and
adjust the range condition based on the parameter satisfying the adjustment condition, wherein the range condition includes or corresponds to a range condition between a transmitting UE and a receiving UE or corresponds to a range condition between two transmitting UEs.

13. The apparatus of claim 11, wherein the at least one processor is further configured to:
receive a radio resource control (RRC) message from a network entity; and
adjust the range condition, the RSRP difference condition, or both, based on the RRC message.

14. The apparatus of claim 11, wherein the at least one processor is further configured to:
determine responsive to determining the medium contention event, whether to transmit feedback for the determined medium contention event based on a second range condition, wherein the range condition includes or corresponds to a range condition between a transmitting UE and a receiving UE, and wherein the second range condition includes or corresponds to a range condition between two transmitting UEs.

15. The apparatus of claim 11, wherein the at least one processor is further configured to:
determine the medium contention event further based on a quality condition, wherein the quality condition includes or corresponds to a signal-to-interference-plus-noise ratio (SINR) condition or a RSRP range condition.

16. The apparatus of claim 11, wherein the at least one processor is further configured to:
prior to receiving the first transmission, determine a medium contention event detection mode, wherein the medium contention event detection mode includes half-duplex detection, collision detection, or both; and
determine the medium contention event for the first and second transmissions of the NR sidelink channel based on the range condition, wherein the medium contention event is determined based on the range condition.

17. The apparatus of claim 11, wherein the first transmission includes a zone identifier (zone-ID) for the first UE, and wherein the at least one processor is further configured to:
determine a distance between the apparatus and the first UE based on the zone-ID, a timing advance value, or a combination thereof; and
determine the medium contention event by comparing the distance to the range condition.

18. A method of wireless communication comprising:
receiving, by a first user equipment (UE), a first transmission from a second UE for a new radio (NR) sidelink channel;
receiving, by the first UE, a second transmission from a third UE for the NR sidelink channel;
determining whether to detect medium contention events for the first and second transmissions based on an overlap between the first and second transmissions; and
transmitting, by the first UE, a feedback transmission based on determining a medium contention event for the first and second transmissions of the NR sidelink channel, the medium contention event determined based on a range condition and based on a comparison of a quality difference condition and a quality difference value between the first and second transmissions.

19. The method of claim 18, wherein the quality difference condition includes or corresponds to a reference signal received power (RSRP) similarity condition or a signal-to-interference-plus-noise ratio (SINR) similarity condition, and further comprising:

determining, by the first UE, the medium contention event for the first and second transmissions of the NR sidelink channel based on the quality difference condition.

20. The method of claim 18, wherein determining the medium contention event based on the quality difference condition includes:
determining the medium contention event for the first and second transmissions; and
determining whether to transmit feedback for the medium contention event based on the quality difference condition.

21. The method of claim 18, wherein the medium contention event comprises a half-duplex operation event or a collision event, wherein the half-duplex operation event corresponds to two or more UEs transmitting at the same time, and wherein the medium contention event includes the collision event, and wherein the collision event corresponds to two or more UEs transmitting at the same time with at least a partial overlap of transmission resources.

22. The method of claim 18, wherein the feedback transmission includes or corresponds to a negative acknowledgment (NACK), the NACK configured to trigger a retransmission of the first transmission or the second transmission, and wherein the feedback transmission is transmitted to the second UE or the third UE.

23. The method of claim 22, further comprising:
transmitting, by the first UE, a second feedback transmission based on determining the medium contention event based on the quality difference condition, wherein the second feedback transmission includes or corresponds to a second NACK configured to trigger a second retransmission of the other of the first transmission or the second transmission, and wherein the feedback transmission is transmitted to the other of the second UE or the third UE.

24. The method of claim 18, further comprising:
determining the medium contention event for the first and second transmissions responsive to determining to detect the medium contention events for the second UE, the third UE, or both; and
determining, responsive to determining the medium contention event, whether to transmit feedback for the determined medium contention event based on a second quality condition or a range condition.

25. An apparatus configured for wireless communication, comprising:
at least one processor; and
a memory coupled to the at least one processor, wherein the at least one processor is configured to:
receive a first transmission from a first UE for a new radio (NR) sidelink channel;
receive a second transmission from a second UE for the NR sidelink channel;
determining whether to detect medium contention events for the first and second transmissions based on an overlap between the first and second transmissions; and
transmit a feedback transmission based on determining a medium contention event for the first and second transmissions of the NR sidelink channel, the medium contention event determined based on a range condition and based on a comparison of a quality difference condition and a quality difference value between the first and second transmissions.

26. The apparatus of claim 25, wherein the first and second transmissions includes or corresponds to sidelink control information (SCI) transmissions, and wherein the at least one processor is further configured to:
- decode the SCI transmissions to determine transmission resources for the first and second transmissions, wherein determining the medium contention event is further based on the determined transmission resources;
- monitor for first and second data transmissions based on the determined transmission resources of the SCI transmissions; and
- attempt to decode the first and second data transmissions prior to determining the medium contention event.

27. The apparatus of claim 25, wherein the at least one processor is further configured to:
- determine a parameter of a network;
- compare the parameter to an adjustment condition; and
- adjust the quality difference condition based on the parameter satisfying the adjustment condition, wherein the adjustment condition is a data decode Signal-to-interference-plus-noise ratio (SINR) condition, a side-link control information (SCI) decode condition, or a SCI1 and SCI2 decode condition.

28. The apparatus of claim 25, wherein the at least one processor is further configured to:
- determine the medium contention event based on a second quality condition, wherein the quality difference condition includes or corresponds to a RSRP similarity condition, and wherein the second quality condition includes or corresponds to a RSRP range condition.

29. The apparatus of claim 25, wherein the range condition includes or corresponds to a range condition between a transmitting UE and a receiving UE or corresponds to a range condition between two transmitting UEs.

30. The apparatus of claim 25, wherein the at least one processor is further configured to:
- determine a quality between the apparatus and the first UE based on the first transmission; and
- determine a second quality between the apparatus and the second UE based on the second transmission, wherein determining the medium contention event includes comparing a difference between the quality and the second quality to the quality difference condition to determine the medium contention event.

* * * * *